United States Patent
Serbu

(10) Patent No.: US 9,068,616 B1
(45) Date of Patent: Jun. 30, 2015

(54) VEHICLE SUSPENSION SYSTEM

(71) Applicant: GM GLOBAL TECHNOLOGY OPERATIONS LLC, Detroit, MI (US)

(72) Inventor: Liviu Serbu, Woodbridge (CA)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/193,742

(22) Filed: Feb. 28, 2014

(51) Int. Cl.
*F16F 9/56* (2006.01)
*B60G 15/06* (2006.01)
*B60G 17/027* (2006.01)
*F16F 9/02* (2006.01)

(52) U.S. Cl.
CPC ............... *F16F 9/0245* (2013.01); *F16F 9/56* (2013.01); *B60G 15/062* (2013.01); *B60G 17/0272* (2013.01)

(58) Field of Classification Search
CPC .. B60G 15/062; B60G 15/067; B60G 15/068; B60G 17/0272; B60G 17/08; F16F 9/56; F16F 9/585; F16F 9/0245; F16F 9/0254; F16F 9/0263
See application file for complete search history.

(56) References Cited

U.S. PATENT DOCUMENTS

| | | | |
|---|---|---|---|
| 6,302,458 B1 * | 10/2001 | Wang et al. ................ 293/132 |
| 8,205,864 B2 * | 6/2012 | Michel ....................... 267/218 |
| 8,573,573 B2 * | 11/2013 | Michel ....................... 267/218 |
| 2004/0036206 A1 * | 2/2004 | Loser et al. ................ 267/218 |
| 2010/0154130 A1 * | 6/2010 | Han et al. ...................... 8/158 |
| 2010/0308518 A1 | 12/2010 | Michel |
| 2011/0101632 A1 * | 5/2011 | Mochizuki .............. 280/6.157 |
| 2012/0261869 A1 * | 10/2012 | Rodenbeck ............... 267/219 |
| 2014/0131960 A1 * | 5/2014 | Moore et al. ............. 280/5.514 |

* cited by examiner

*Primary Examiner* — Drew Brown
(74) *Attorney, Agent, or Firm* — Quinn Law Group, PLLC

(57) ABSTRACT

A suspension system for a vehicle includes a damper having a central longitudinal axis, and a jack assembly attached to the damper. The jack assembly includes a seat translatable with respect to the damper along the central longitudinal axis. The seat includes a first rack having a first exterior surface defining a plurality of first grooves therein, and a second rack having a second exterior surface defining a plurality of second grooves therein. The jack assembly also includes a first pinion including a plurality of first teeth each matable with each of the plurality of first grooves, and a second pinion including a plurality of second teeth each matable with each of the plurality of second grooves. A vehicle including the suspension system is also disclosed.

18 Claims, 12 Drawing Sheets

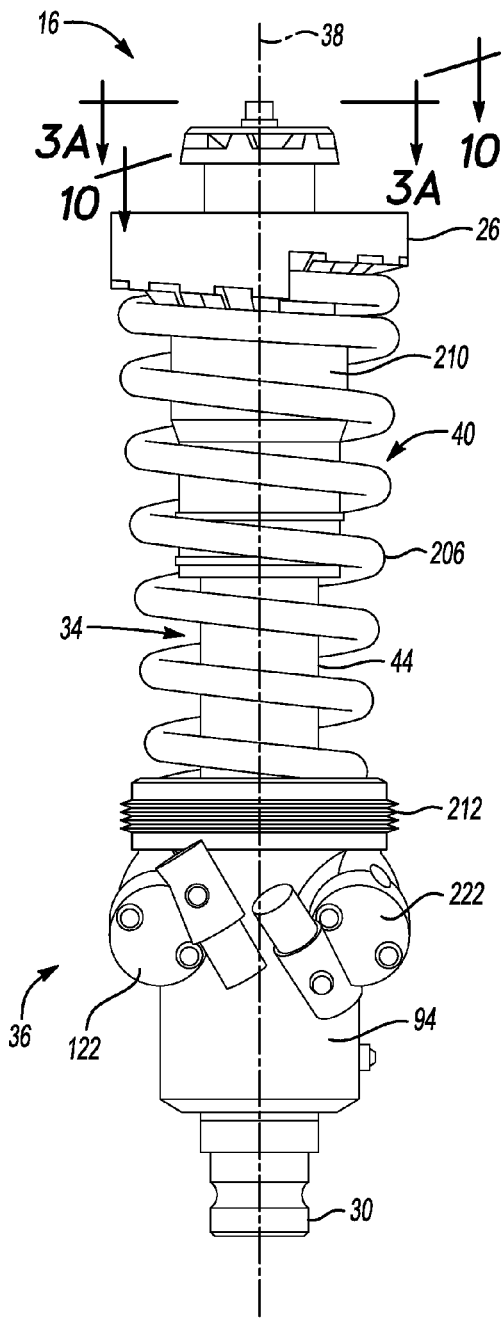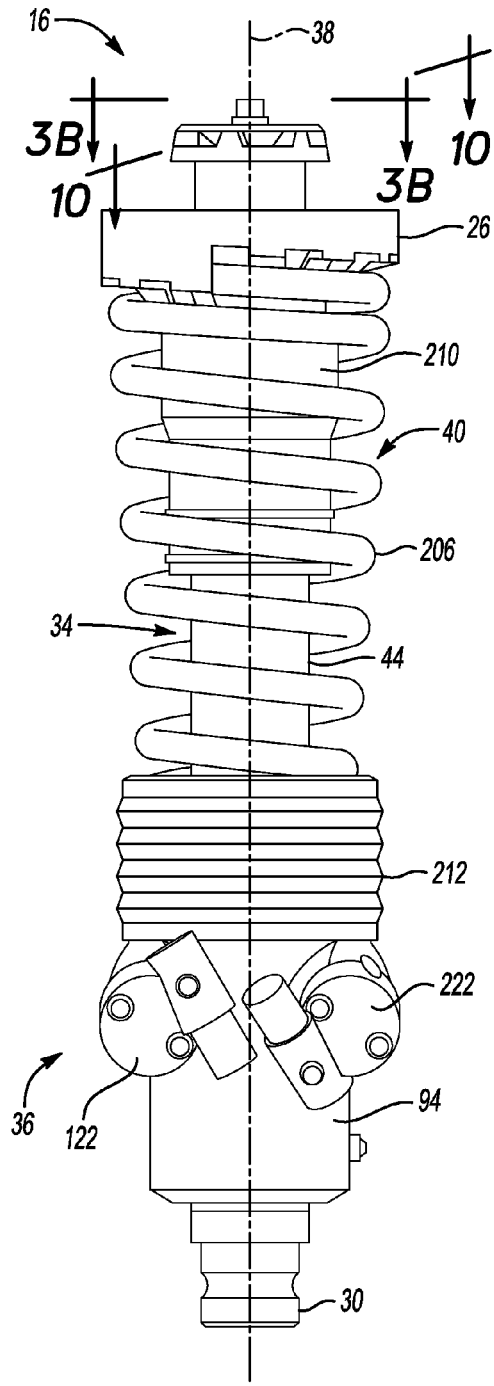
Fig-2A
Fig-2B

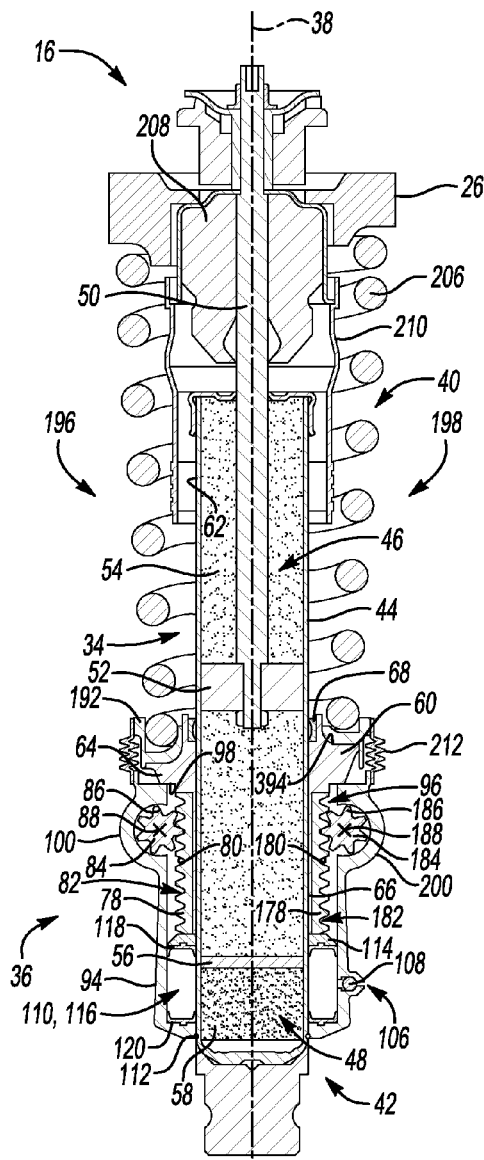
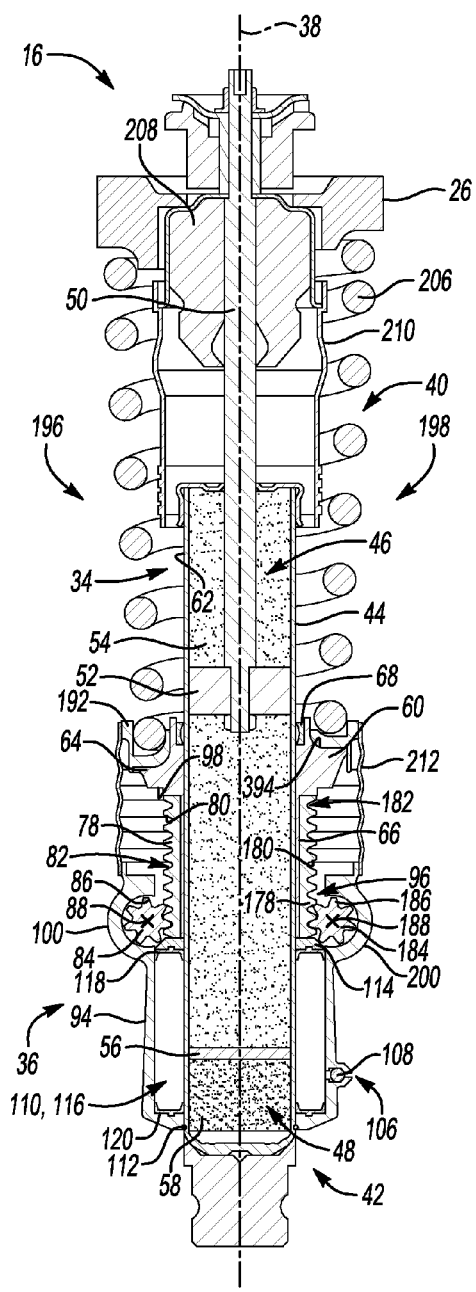
Fig-3A
Fig-3B

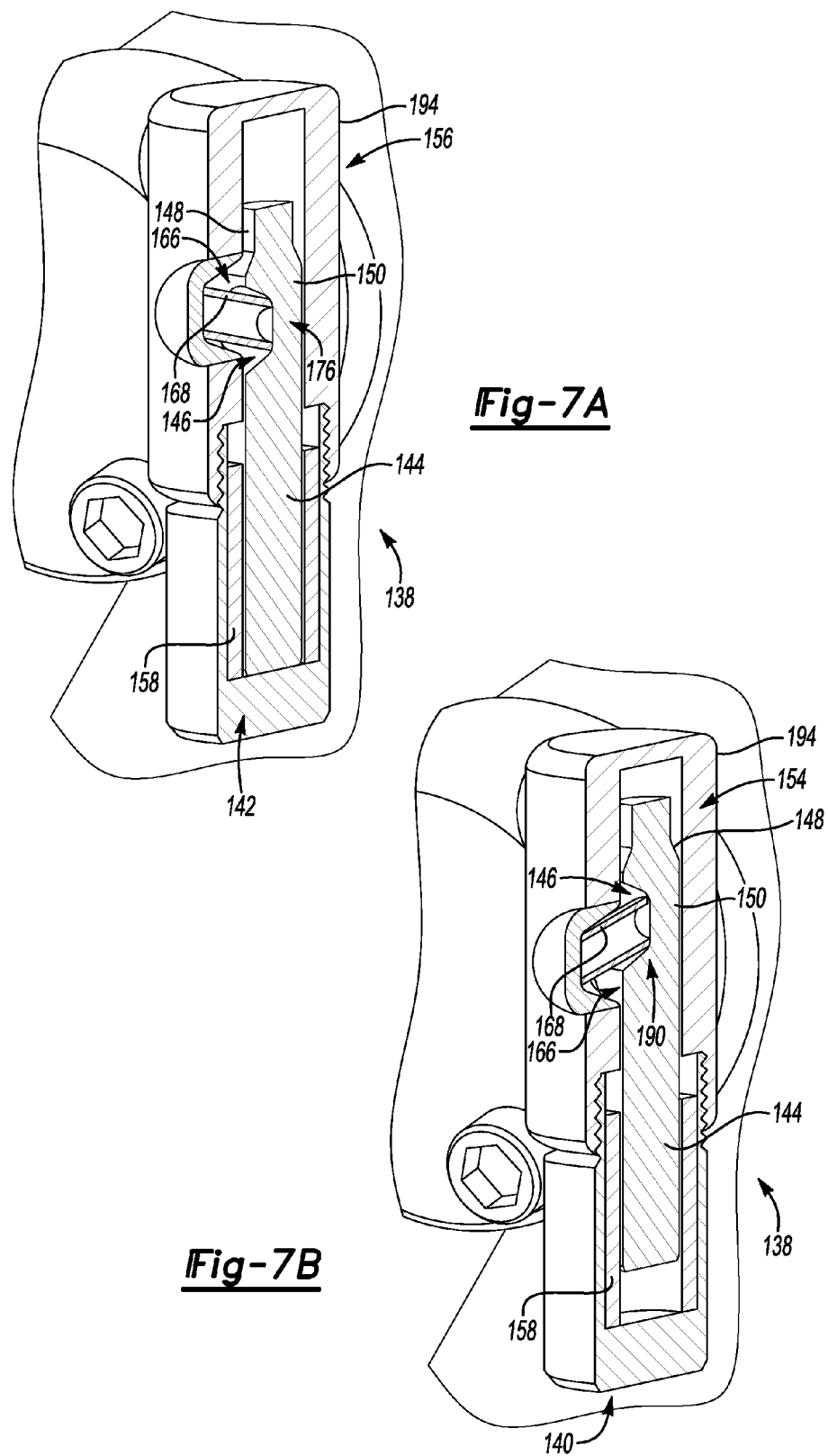

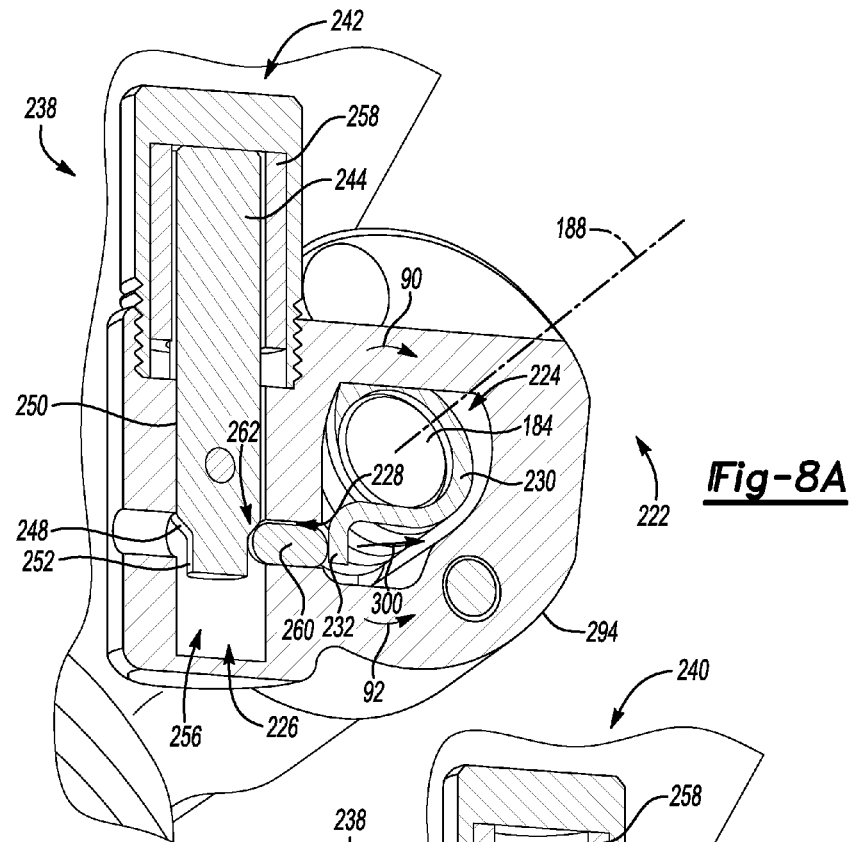
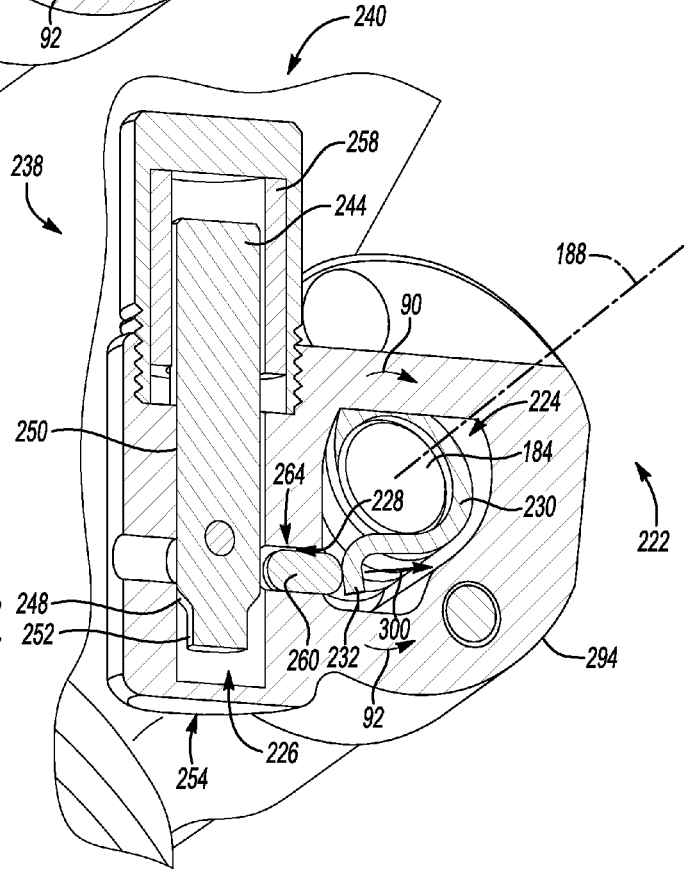

VEHICLE SUSPENSION SYSTEM

TECHNICAL FIELD

The disclosure relates to a suspension system for a vehicle.

BACKGROUND

Suspension systems for vehicles generally interconnect a body of the vehicle and one or more wheels of the vehicle, and optimize vehicle steering, vehicle braking, and occupant comfort. Such suspension systems may include a damper which isolates the body of the vehicle from jolts and bumps as the vehicle travels across a rough or uneven surface.

SUMMARY

A suspension system for a vehicle includes a damper having a central longitudinal axis and a jack assembly attached to the damper. The jack assembly includes a seat translatable with respect to the damper along the central longitudinal axis. The seat includes a first rack having a first exterior surface defining a plurality of first grooves therein, and a second rack having a second exterior surface defining a plurality of second grooves therein. Further, the jack assembly also includes a first pinion including a plurality of first teeth each matable with each of the plurality of first grooves, and a second pinion including a plurality of second teeth each matable with each of the plurality of second grooves.

In one embodiment, the suspension system includes an upper strut mount configured for attaching to the vehicle. Further, the damper is attached to the upper strut mount and includes a tube defining therein a first chamber and a second chamber spaced apart from the first chamber. The damper also includes a piston rod translatable along the central longitudinal axis within the first chamber, and a working piston connected to the piston rod and abutting the tube. The jack assembly includes a housing affixed to the tube and defining a cavity therein, and the housing is stationary with respect to the damper along the central longitudinal axis. In addition, the jack assembly includes a seat at least partially disposed within the cavity and abutting the tube. The seat is translatable with respect to the damper along the central longitudinal axis. The seat includes a flange portion, a leg portion extending from the flange portion along the central longitudinal axis, a first rack, and a second rack. The first rack is disposed in contact with the flange portion and the leg portion and has a first exterior surface defining a plurality of first grooves therein. The second rack is spaced apart from the first rack about the central longitudinal axis, is disposed in contact with the flange portion and the leg portion, and has a second exterior surface defining a second plurality of grooves therein. In addition, the jack includes a lower mount abutting the flange portion. The jack assembly further includes a first pinion disposed within the cavity and including a plurality of first teeth each matable with each of the plurality of first grooves. The first pinion is rotatable about a first axis and is not translatable along the central longitudinal axis. The jack assembly further includes a second pinion disposed within the cavity and including a plurality of second teeth each matable with any of the plurality of second grooves. The second pinion is rotatable about a second axis and is not translatable along the central longitudinal axis. The jack assembly also includes an annular piston disposed within the cavity and abutting the first rack, the second rack, and the leg portion. The annular piston is translatable along the central longitudinal axis and defines a pressure chamber having a volume between the housing and the tube. Further, the jack assembly includes a first seal disposed within the pressure chamber. The first seal is attached to the annular piston and abuts the housing and the tube. The jack assembly also includes a second seal disposed within the pressure chamber. The second seal is spaced apart from the first seal along the central longitudinal axis and abuts the housing and the tube. Additionally, the jack assembly includes a first clutch attached to the housing and configured for restricting rotation of the first pinion about the first axis, and a second clutch attached to the housing and configured for restricting rotation of the second pinion about the second axis. The suspension system also includes a resilient member disposed between and attached to the upper strut mount and the lower mount.

A vehicle includes a body, a wheel configured for translating the body across a surface, and a suspension system interconnecting the body and the wheel. The suspension system includes a damper having a central longitudinal axis, and a jack assembly attached to the damper. The jack assembly includes a seat translatable with respect to the damper along the central longitudinal axis. The seat includes a first rack having a first exterior surface defining a plurality of first grooves therein, and a second rack having a second exterior surface defining a plurality of second grooves therein. The jack assembly also includes a first pinion including a plurality of first teeth each matable with each of the plurality of first grooves, and a second pinion including a plurality of second teeth each matable with each of the plurality of second grooves.

The above features and advantages and other features and advantages of the present disclosure will be readily apparent from the following detailed description of the preferred embodiments and best modes for carrying out the present disclosure when taken in connection with the accompanying drawings and appended claims.

BRIEF DESCRIPTION OF THE DRAWINGS

FIG. 2A is a schematic illustration of a side view of the suspension system of FIG. 1, wherein a portion of the suspension system is compressed;

FIG. 2B is a schematic illustration of a side view of the suspension system of FIG. 2A, wherein the portion of the suspension system is extended;

FIG. 3A is a schematic illustration of a cross-sectional view of the suspension system of FIG. 2A, taken along section lines 3A-3A;

FIG. 3B is a schematic illustration of a cross-sectional view of the suspension system of FIG. 2B, taken along section lines 3B-3B;

FIG. 7A is a schematic illustration of a cross-sectional perspective view of the suspension system of FIG. 4, taken along section lines 7-7, wherein the first actuator of FIG. 6A is disposed in the de-energized state;

FIG. 7B is a schematic illustration of a cross-sectional perspective view of the suspension system of FIG. 4, taken along section lines 7-7, wherein the first actuator of FIG. 6A is disposed in the energized state;

FIG. 8A is a schematic illustration of a cross-sectional perspective view of the suspension system of FIG. 4, taken along section lines 8-8, wherein a second actuator is disposed in a de-energized state;

FIG. 8B is a schematic illustration of a cross-sectional perspective view of the suspension system of FIG. 4, taken along section lines 8-8, wherein the second actuator of FIG. 8A is disposed in an energized state;

DETAILED DESCRIPTION

Figure 1:
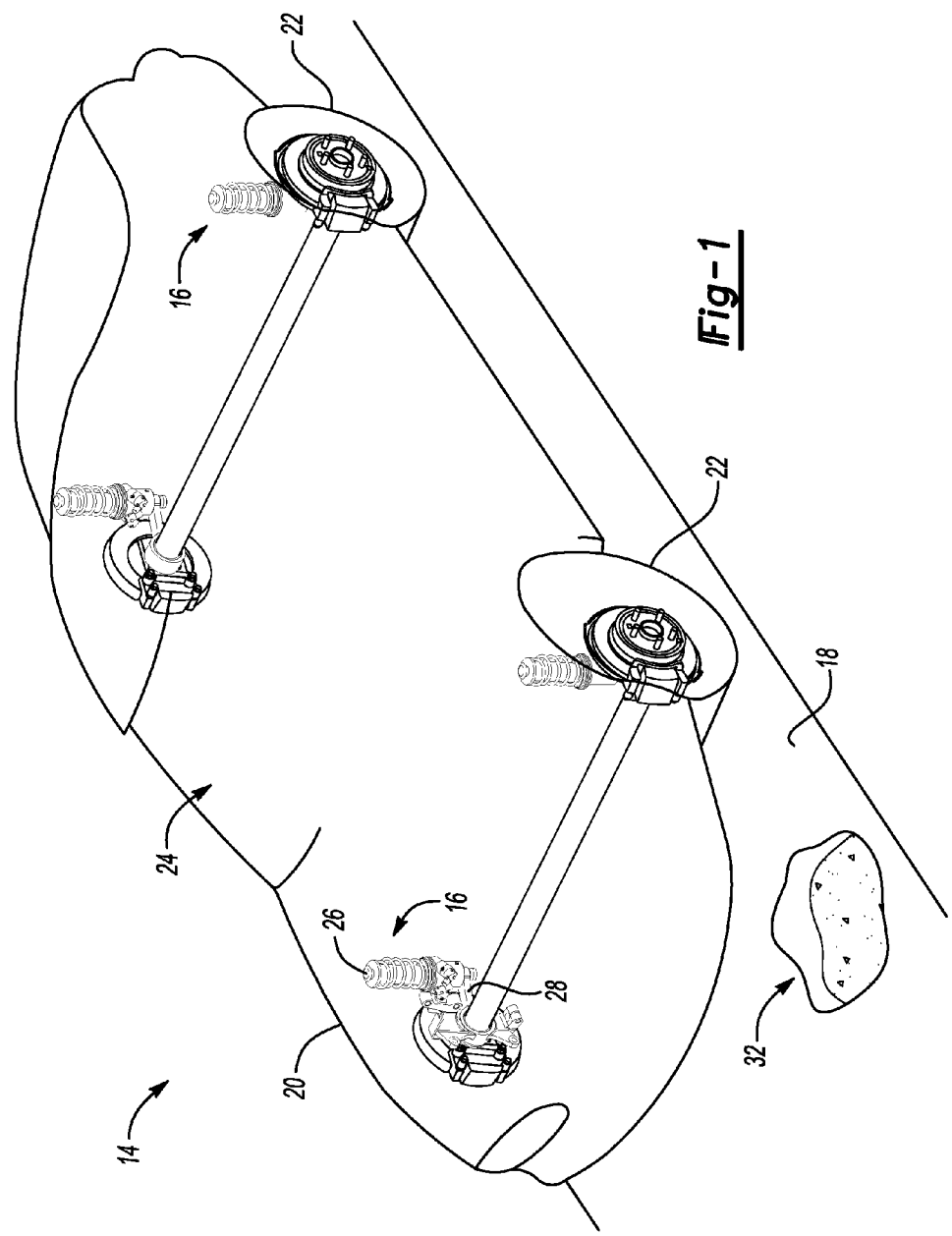
FIG. 1 is a schematic illustration of a perspective view of a vehicle including a suspension system.

Referring to the Figures, wherein like reference numerals refer to like elements, a vehicle 14 including a suspension system 16 is shown in FIG. 1. The vehicle 14 and suspension system 16 may be useful for applications requiring excellent vehicle aerodynamics and occupant comfort during vehicle steering maneuvers and/or vehicle travel over uneven surfaces 18. Therefore, the vehicle 14 and suspension system 16 may be useful for automotive vehicles, but may also be useful for non-automotive vehicles, such as recreational vehicles and aircraft.

Referring again to FIG. 1, the vehicle 14 includes a body 20 and a wheel 22 configured for translating the body 20 across the surface 18. For example, the body 20 may define a passenger compartment 24 therein, and the vehicle 14 may include a plurality of wheels 22 configured for supporting and steering the body 20 as the vehicle 14 translates across the surface 18. Further, the body 20 may be characterized as a rigid member or a unibody.

As set forth in more detail below and described with reference to FIG. 1, the suspension system 16 may further include an upper strut mount 26 configured for attaching to the vehicle 14, e.g., the upper strut mount 26 may be attached to the body 20, and a steering component 28 configured for both steering the wheel 22 and attaching the suspension system 16 to the wheel 22. That is, the steering component 28 may be attached to the wheel 22, and the suspension system 16 may include a lower strut mount 30 (FIG. 2A) attached to the steering component 28. The upper strut mount 26 may be a component of a top mount assembly or plate (not shown) that may bolt or otherwise fixedly attach to the body 20 of the vehicle 14. The steering component 28 may be, by way of non-limiting examples, a steering knuckle, a tie rod, or a control arm. Therefore, the suspension system 16 may be attached to and disposed between the body 20 and the steering component 28, as set forth in more detail below.

Figure 11:
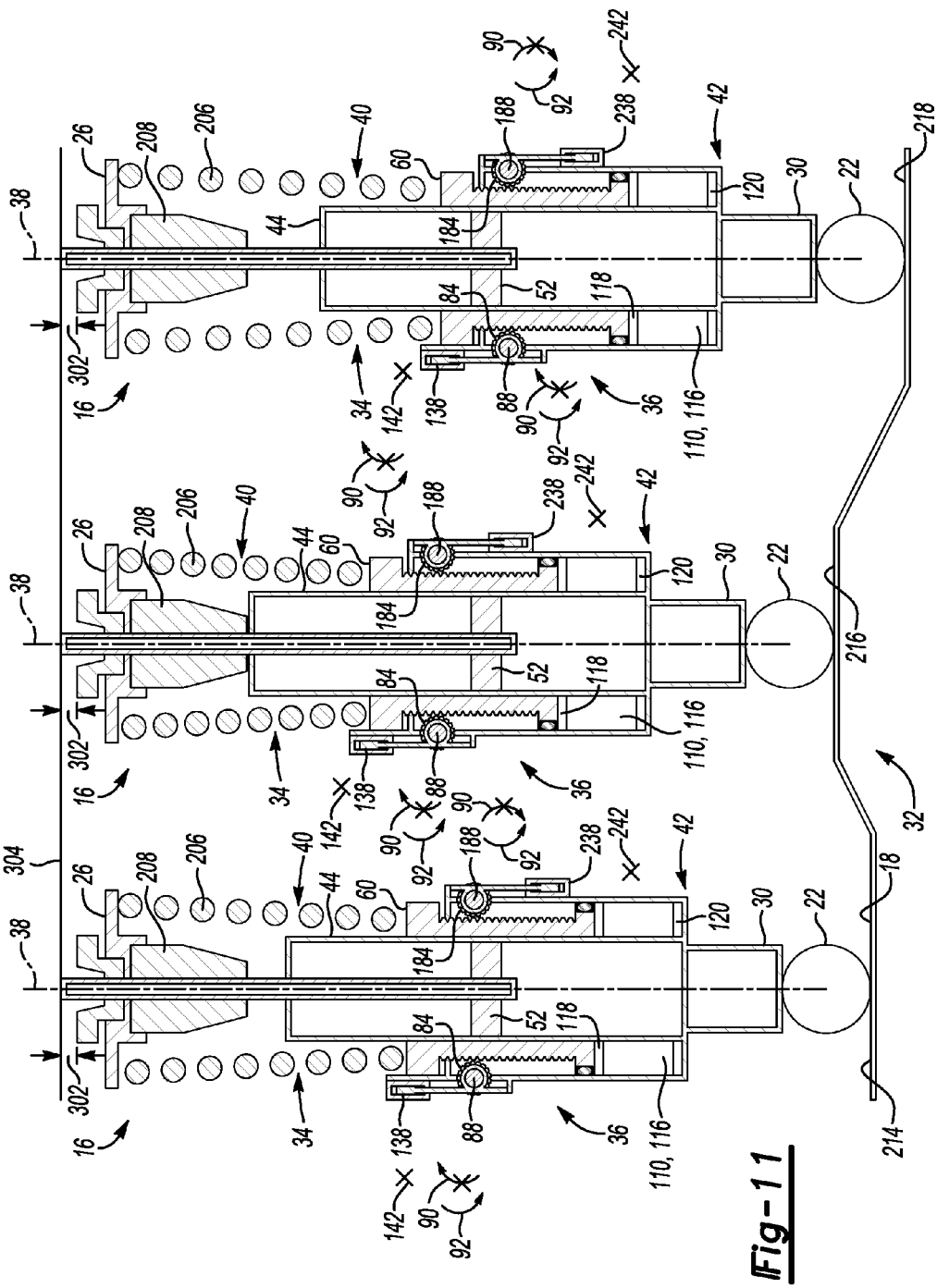
FIG. 11 is a schematic illustration of a generalized representation of the suspension system of FIG. 2A as the vehicle of FIG. 1 travels along an uneven surface, wherein a ride height of the vehicle is maintained.
Figure 12:
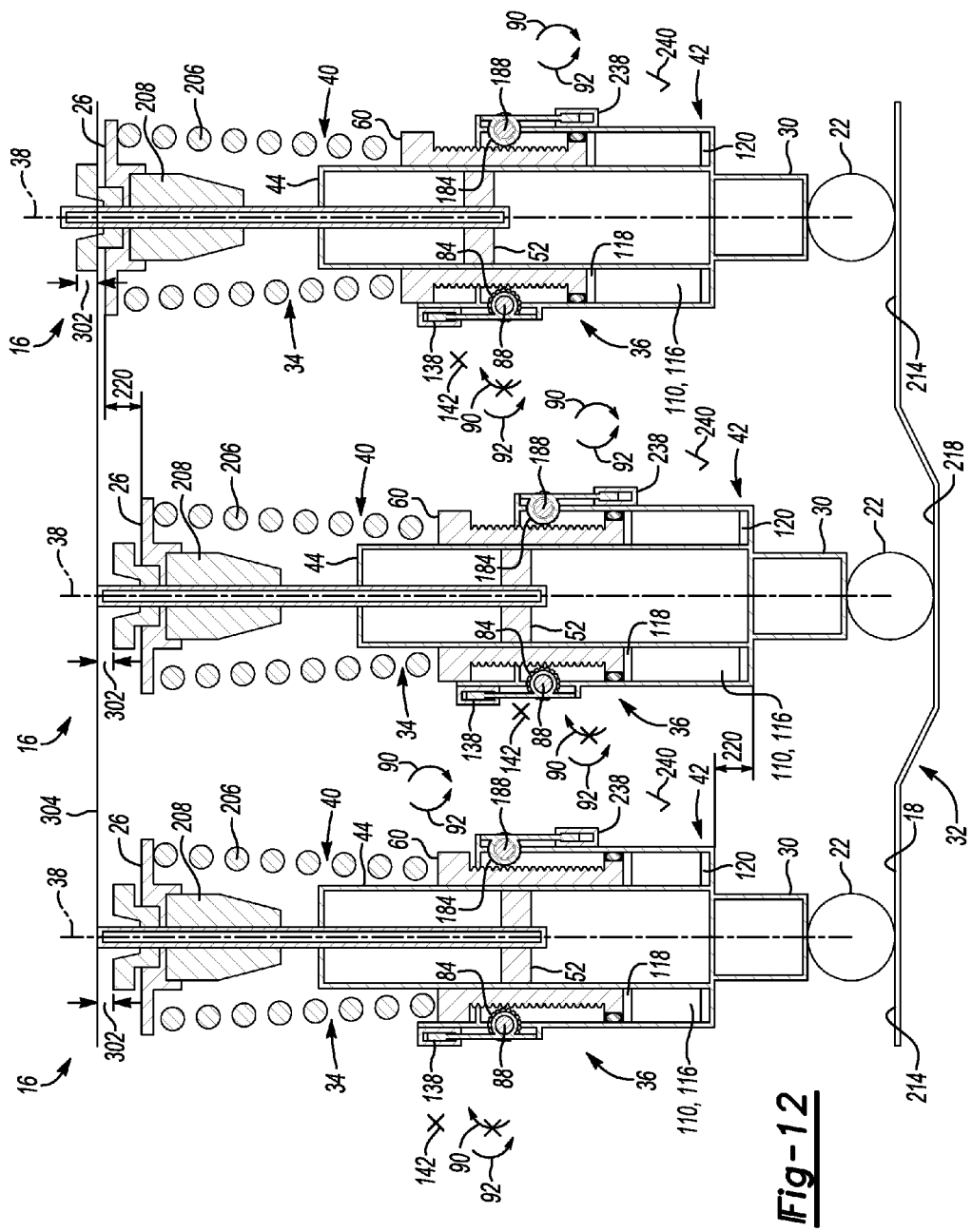
FIG. 12 is a schematic illustration of a generalized representation of the suspension system of FIG. 2A as the vehicle of FIG. 1 travels along an uneven surface, wherein a ride height of the vehicle is raised.
Figure 13:
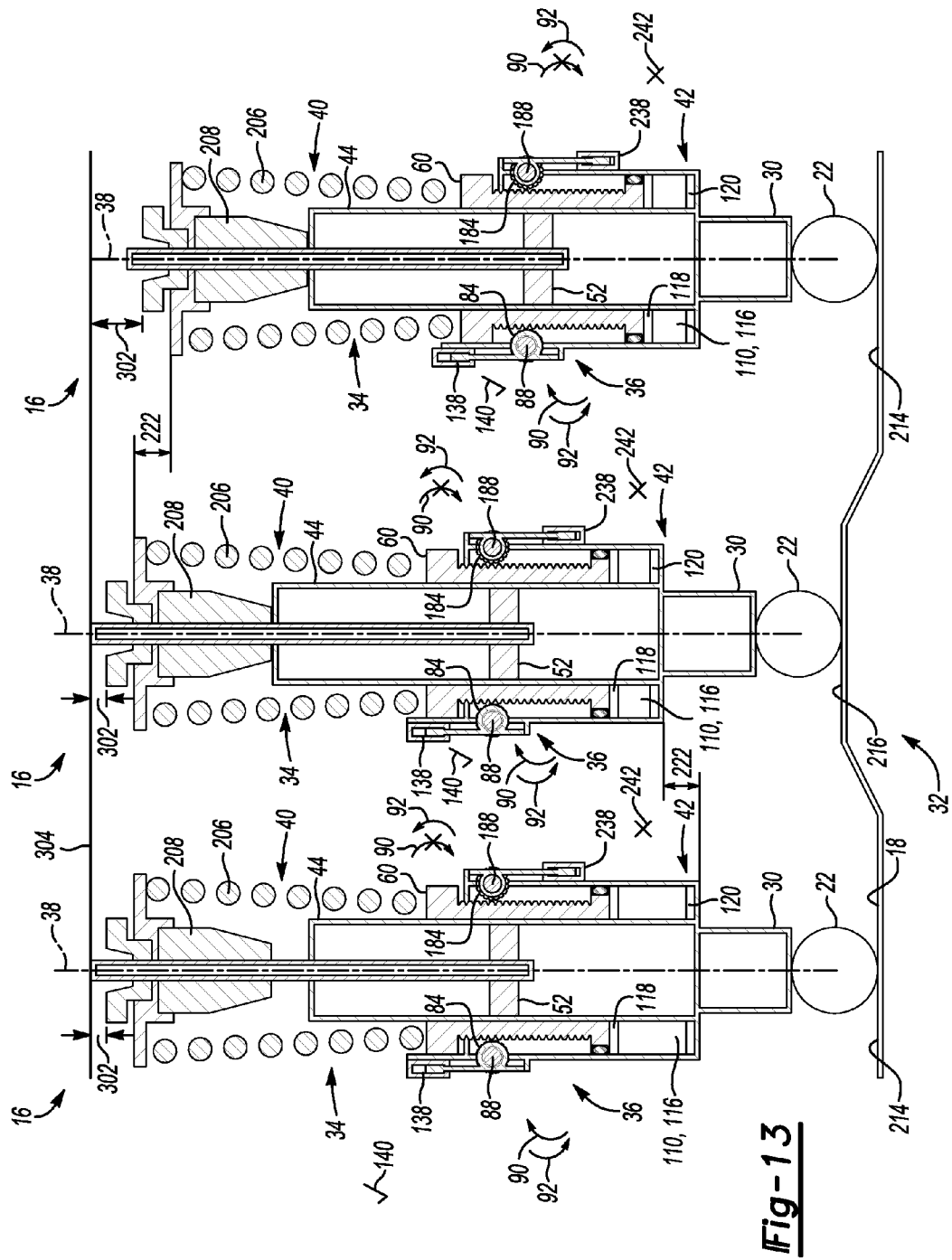
FIG. 13 is a schematic illustration of a generalized representation of the suspension system of FIG. 2A as the vehicle of FIG. 1 travels along an uneven surface, wherein a ride height of the vehicle is lowered.

Further, with continued reference to FIG. 1 and additional reference to FIGS. 11-13, although shown only generally, it is to be appreciated that the surface 18 may be rough or uneven and may include or define irregularities such as uneven portions (indicated generally at 32), potholes, ruts, rumble strips, bumps, and/or recessions. Further, the vehicle 14 may be configured for translating across the surface 18 at a comparatively high rate of speed during a high-speed driving condition, e.g., a highway driving condition. Conversely, the vehicle 14 may be configured for translating across the surface 18 at a comparatively low rate of speed during a low-speed driving condition, e.g., a surface street driving condition.

With continued reference to FIG. 1, the vehicle 14 includes the suspension system 16 interconnecting the body 20 and the wheel 22 and configured for optimizing vehicle steering, vehicle braking, and occupant comfort as the vehicle 14 translates across the surface 18. That is, the suspension system 16 may be characterized as a strut. In particular, the suspension system 16 may control a ride height 302 (FIGS. 11-13) of the body 20 with respect to a reference height 304 (FIGS. 11-13) as the wheel 22 translates across the surface 18. More specifically, the suspension system 16 may raise and lower the body 20 of the vehicle 14 with respect to the wheel 22 according to whether the vehicle 14 is traveling at a comparatively high rate of speed during high-speed driving conditions, or at a comparatively low rate of speed during low-speed driving conditions. As such, the suspension system 16 may lower the body 20 of the vehicle 14 with respect to the wheel 22, i.e., lower the ride height 302, to optimize vehicle aerodynamics during high-speed driving conditions, and may raise the body 20 of the vehicle 14 with respect to the wheel 22, i.e., raise the ride height 302, to optimize clearance between the body 20 and the surface 18 during low-speed driving conditions. Further, the suspension system 16 may raise and lower the body 20 to, for example, assist occupants with ingress into and/or egress from the passenger compartment 24 and/or provide additional body 20-to-surface 18 clearance for extreme or rough surface conditions.

Referring now to FIGS. 2A-3B, the suspension system 16 includes a damper 34 and a jack assembly 36. As set forth in more detail below, the jack assembly 36 is attached to the damper 34 and may be configured for raising and lowering the body 20 (FIG. 1) of the vehicle 14 (FIG. 1) with respect to the wheel 22 (FIG. 1).

In particular, referring now to FIGS. 3A and 3B, the damper 34 has a central longitudinal axis 38 and may have a proximal end 40 and a distal end 42 spaced apart from the proximal end 40 along the central longitudinal axis 38. That is, the proximal end 40 may attach to the body 20 (FIG. 1) and the distal end 42 may attach to the wheel 22 (FIG. 1). More specifically, as described with reference to FIG. 2A, the proximal end 40 may be attached to the upper strut mount 26, and the distal end 42 may be attached to a lower strut mount 30, which may in turn be attached to the steering component 28 (FIG. 1). That is, the suspension system 16 may include the lower strut mount 30 spaced apart from the upper strut mount 26 along the central longitudinal axis 38. Therefore, the upper strut mount 26 may be attached to the body 20 and the damper 34, and the lower strut mount 30 may be attached to the damper 34 and the steering component 28.

With continued reference to FIGS. 3A and 3B, the damper 34 may include a tube 44 defining therein a first chamber 46 and a second chamber 48 spaced apart from the first chamber 46 along the central longitudinal axis 38. As such, the tube 44 may be characterized as a mono-tube shock absorber and may be configured for minimizing forces transmitted to the body 20 (FIG. 1) as the wheel 22 (FIG. 1) translates across uneven portions 32 (FIG. 1) of the surface 18 (FIG. 1). Further, the damper 34 may include a piston rod 50 translatable along the central longitudinal axis 38 within the first chamber 46, and a working piston 52 connected to the piston rod 50 and abutting the tube 44. The piston rod 50 may translate towards and away from the wheel 22 (FIG. 1) as the wheel 22 travels across the surface 18 (FIG. 1) and may compensate for jolts or bounces of the body 20 (FIG. 1) with respect to the surface 18.

Referring again to FIGS. 3A and 3B, the working piston 52 may define a plurality of orifices (not shown) therein, and the damper 34 may include a hydraulic fluid (represented generally by shading 54) disposed within the first chamber 46 and conveyable through the working piston 52. Therefore, as the wheel 22 (FIG. 1) travels across the surface 18 (FIG. 1), the body 20 (FIG. 1) and a sprung mass, e.g., a drivetrain (not shown), of the vehicle 14 may alternately translate the piston rod 50 and working piston 52 towards and away from the distal end 42 of the damper 34 along the central longitudinal axis 38. More specifically, as the working piston 52 translates along the central longitudinal axis 38, some hydraulic fluid 54 may pass through the plurality of orifices (not shown) of the working piston 52 such that the damper 34 may absorb and dissipate kinetic energy from the movement of the body 20 as the vehicle 14 translates along the surface 18. More specifically, the damper 34 may convert kinetic energy to thermal energy through fluid friction as the piston rod 50 and the working piston 52 translate through the hydraulic fluid 54 along the central longitudinal axis 38 within the first chamber 46.

As also shown in FIGS. 3A and 3B, the damper 34 may also include a floating piston 56 disposed between and separating the first chamber 46 and the second chamber 48. The floating piston 56 may also translate along the central longitudinal axis 38 as the working piston 52 translates along the central longitudinal axis 38 during vehicle travel along the surface 18. Further, the damper 34 may include a gas (represented generally by shading 58) disposed within the second chamber 48 and not conveyable between the first chamber 46 and the second chamber 48. The gas 58, e.g., nitrogen gas, may be pressurized and may additionally support a portion of a mass of the body 20 (FIG. 1) and unsprung mass of the vehicle 14 (FIG. 1) and compensate for changes in volume of the first chamber 46 and/or the second chamber 48 as the piston rod 50 translates along the central longitudinal axis 38.

Referring again to FIGS. 2A-3B, the suspension system 16 further includes the jack assembly 36 attached to the damper 34. As set forth above, the jack assembly 36 may be configured for raising and lowering the body 20 (FIG. 1) of the vehicle 14 (FIG. 1) with respect to the wheel 22 (FIG. 1). For example, the jack assembly 36 may lower the body 20 of the vehicle 14 during high-speed driving conditions to improve aerodynamic drag and fuel economy of the vehicle 14.

As described with reference to FIGS. 3A and 3B, the jack assembly 36 includes a seat 60 translatable with respect to the damper 34 along the central longitudinal axis 38. That is, the seat 60 may abut and slide along an external surface 62 of the tube 44 along the central longitudinal axis 38 to thereby raise and lower the body 20 (FIG. 1) of the vehicle 14 (FIG. 1). In one non-limiting example, the seat 60 may be a spring seat. That is, the seat 60 may be annular and may surround and contact the external surface 62. Further, the seat 60 may be coaxial with the central longitudinal axis 38 and may be formed from a suitable material, such as aluminum. More specifically, the seat 60 may include a flange portion 64 and a leg portion 66 extending from the flange portion 64 along the central longitudinal axis 38.

With continued reference to FIGS. 3A and 3B, the suspension system 16 may also include a sealing member 68 disposed between and in contact with the flange portion 64 and the tube 44. The sealing member 68 may be, for example, an annular o-ring formed from an elastomeric material, may be configured for allowing sealed translation of the seat 60 along the external surface 62, and may minimize contamination and/or wear of the external surface 62 from, for example, debris and/or fluid.

Figure 10:
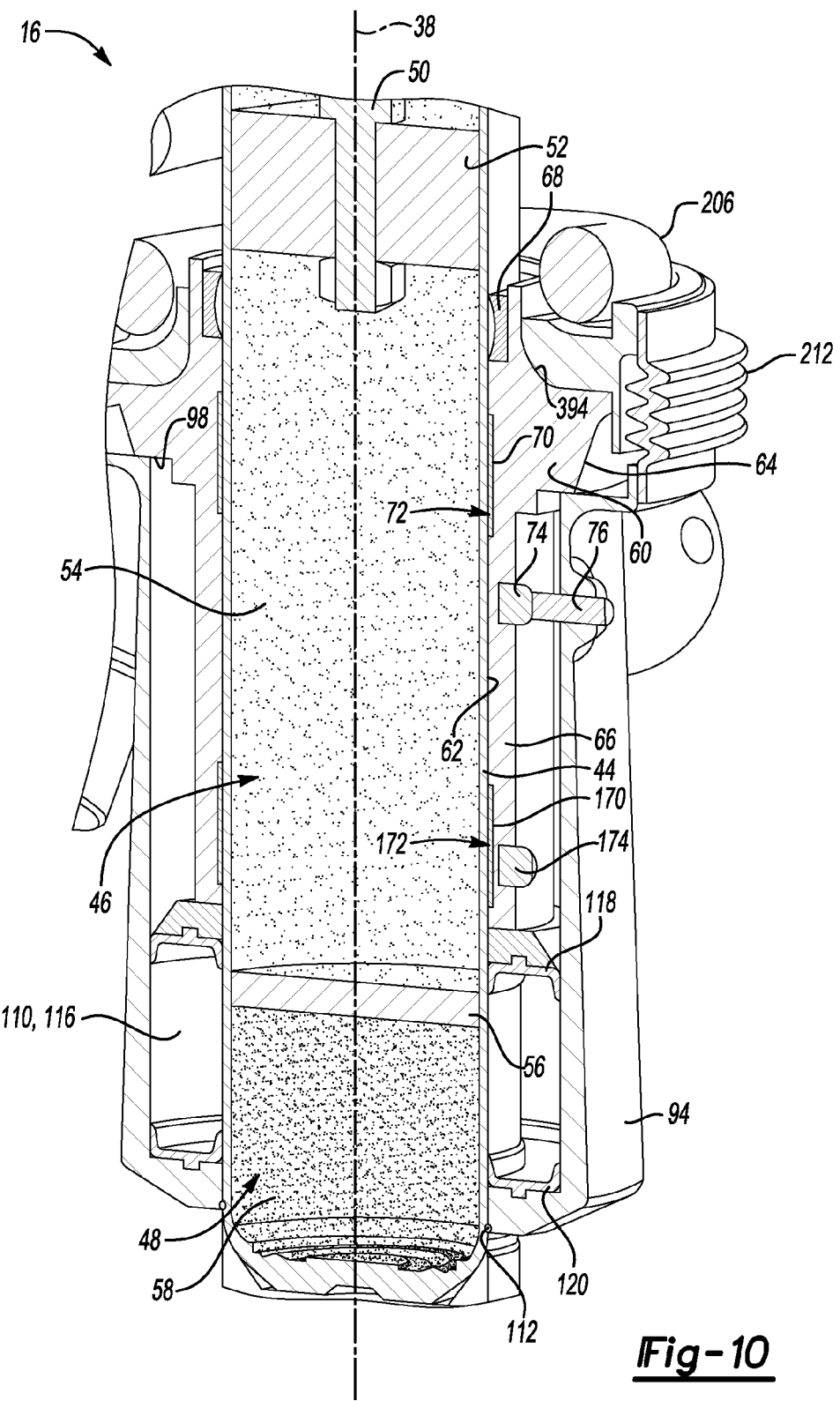
FIG. 10 is a schematic illustration of a cross-sectional perspective view of the suspension system of FIG. 2A, taken along section lines 10-10.

Further, referring now to FIG. 10, the seat 60 may also include one or more sleeves 70, 170 disposed in contact with the tube 44. The one or more sleeves 70, 170 may be characterized as anti-friction sleeves and may be formed from, for example, polytetrafluoroethylene. The seat 60 may define one or more respective cutouts 72, 172, and as assembled, the one or more sleeves 70, 170 may each be disposed with a respective one of the one or more cutouts 72, 172 to facilitate smooth translation of the seat 60 along the external surface 62 of the tube 44.

With continued reference to FIG. 10, the seat 60 may further include a high position target 74 and a low position target 174 spaced apart from the high position target 74 along the central longitudinal axis 38. Further, the suspension system 16 may include a travel position sensor 76 communicatable with the high position target 74 and the low position target 174. For example, the high position target 74 and the low position target 174 may each be a mechanical, electrical, and/or magnetic element disposed along the leg portion 66, and may each be configured to communicate with, abut, or otherwise trigger the travel position sensor 76 to thereby prevent the seat 60 from translating along the central longitudinal axis 38 past a respective predetermined upper limit and a predetermined lower limit.

Referring again to FIGS. 3A and 3B, the seat 60 also includes a first rack 78 having a first exterior surface 80 defining a plurality of first grooves 82 therein. The first rack 78 may be disposed in contact with the flange portion 64 and the leg portion 66. Further, the seat 60 includes a second rack 178 having a second exterior surface 180 defining a plurality of second grooves 182 therein. The second rack 178 may be spaced apart from the first rack 78 and disposed symmetrically about the central longitudinal axis 38. The second rack 178 may also be disposed in contact with the flange portion 64 and the leg portion 66.

With continued reference to FIGS. 3A and 3B, the jack assembly 36 also includes a first pinion 84 including a plurality of first teeth 86 each matable with each of the plurality of first grooves 82, and a second pinion 184 including a plurality of second teeth 186 each matable with each of the plurality of second grooves 182. The first pinion 84 may be rotatable about a first axis 88. That is, the first pinion 84 may be rotatable about the first axis 88 in two directions, e.g., in a first direction 90 (FIG. 6A) and a second direction 92 (FIG. 6A) that is opposite the first direction 90. The first direction 90 may be clockwise rotation and the second direction 92 may be counterclockwise rotation. Likewise, the second pinion 184 may be rotatable about a second axis 188. For example, the second pinion 184 may be rotatable about the second axis 188 in two directions, e.g., in the first direction 90 and the second direction 92. The second axis 188 may be parallel to the first axis 88 and perpendicular to the central longitudinal axis 38.

The first pinion 84 and the second pinion 184 may be independently rotatable so that the first pinion 84 is traversable along the first rack 78 and the second pinion 184 is traversable along the second rack 178, thereby translating the seat 60 along the central longitudinal axis 38. For example, only the first pinion 84 may rotate about the first axis 88 in the first direction 90 and/or the second direction 92 while the second pinion 184 is restricted or prevented from rotating about the second axis 188. Alternatively, only the second pinion 184 may rotate about the second axis 188 in the first direction 90 and/or the second direction 92 while the first pinion 84 is restricted or prevented from rotating about the first axis 88. In another variation, both the first pinion 84 may rotate about the first axis 88 in the first direction 90 and/or the second direction 92 and the second pinion 184 may rotate about the second axis 188 in the first direction 90 and/or the second direction 92. That is, both the first pinion 84 and the second pinion 184 may concurrently freely rotate about the respective first axis 88 and second axis 188. In yet another variation, neither the first pinion 84 may rotate about the first axis 88 in the first direction 90 and/or the second direction 92 nor the second pinion 184 may rotate about the second axis 188 in the first direction 90 and/or the second direction 92. That is, both the first pinion 84 and the second pinion 184 may be concurrently restricted or prevented from rotating about the respective first axis 88 and second axis 188. In one non-limiting example, the first pinion 84 and the second pinion 184 may each be prevented from rotating about the first axis 88 and the second axis 188 respectively in only the first direction 90. That is, the first pinion 84 and the second pinion 184 may each be configured so that rotation in the second direction 92 is allowed, i.e., not prevented, so that the first pinion 84 and the second pinion 184 may always freely rotate in the second direction 92.

Referring again to FIGS. 3A and 3B, the jack assembly 36 may further include a housing 94 affixed to the tube 44 and defining a cavity 96 therein. That is, the housing 94 may be stationary or not translatable with respect to the damper 34 along the central longitudinal axis 38. The housing 94 may be affixed to the tube 44 in any suitable manner. For example, the housing 94 may be welded, compression fit, interference fit, or bolted to the tube 44. The seat 60 may be at least partially disposed within the cavity 96 and may abut the housing 94 when the suspension system 16 is disposed in a lowered position. For example, a lower surface 98 of the flange portion 64 may abut the housing 94 when the suspension system 16 is disposed in the lowered position. Conversely, the flange portion 64 may not abut the housing 94 and only the leg portion 66 of the seat 60 may be disposed within the cavity 96 when the suspension system 16 is disposed in a raised position.

Figure 5:
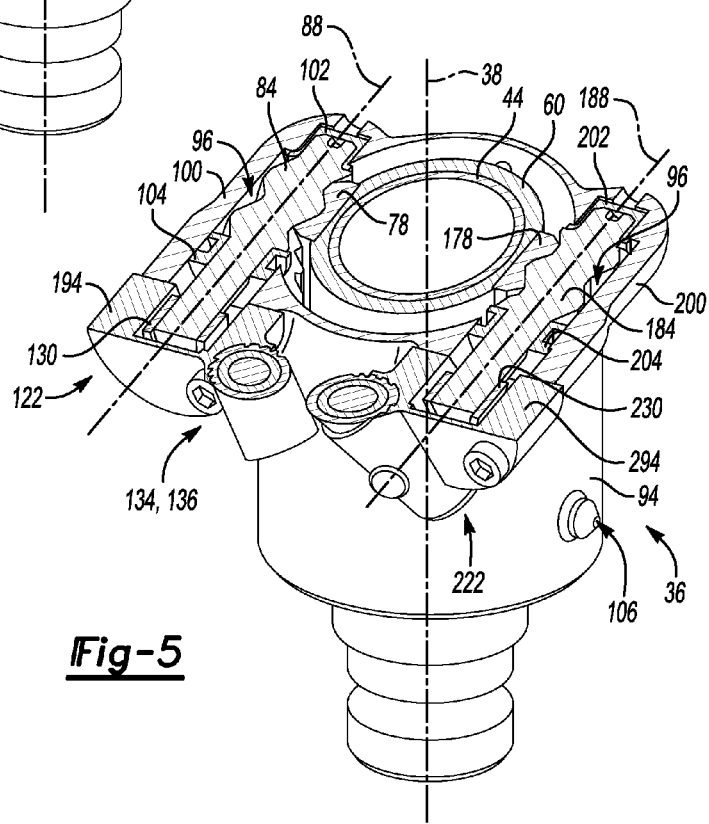
FIG. 5 is a schematic illustration of a cross-sectional perspective view of a portion of the jack assembly of FIG. 4, taken along section lines 5-5.

Further, as shown in FIGS. 3A, 3B, and 5, the first pinion 84 and the second pinion 184 may be disposed within the cavity 96. That is, the first pinion 84 and the second pinion 184 may rotate about the respective first axis 88 and second axis 188 within the cavity 96. As such, the housing 94 may include a plurality of protrusions 100, 200 that surround a respective one of the first pinion 84 and the second pinion 184. As best shown in FIG. 5, the suspension system 16 may also include a plurality of bearings 102, 104, 202, 204 configured for lubricating the first pinion 84 and the second pinion 184 and maintaining the position of the first pinion 84 and the second pinion 184 within the cavity 96. For example, two bearings 102, 104 may be disposed in contact with the first pinion 84, and two bearings 202, 204 may be disposed in contact with the second pinion 184. That is, each of the two bearings 102, 104 may be spaced apart from one another along the first axis 88, and each of the two bearings 202, 204 may be spaced apart from one another along the second axis 188. Each of the plurality of bearings 102, 104, 202, 204 may be, for example, a composite self-lubricated bushing.

Referring again to FIGS. 3A and 3B, the housing 94 may further define a port 106 therein. The port 106 may include a check valve 108 and may be configured for filling or augmenting a pressure chamber 110 with a pressurized gas, as set forth in more detail below. That is, the housing 94 and the tube 44 may define the pressure chamber 110 therebetween and the port 106 may be useful for both initial pressurization of the pressure chamber 110 and maintenance of the jack assembly 36.

As shown in FIGS. 3A and 3B, the housing 94 may also include a retaining ring 112 abuttable with the tube 44 at, for example, the distal end 42 of the damper 34. The retaining ring 112 may further ensure that the housing 94 does not translate along the central longitudinal axis 38 during operation of the suspension system 16.

As described with reference to FIGS. 3A and 3B, the jack assembly 36 may further include an annular piston 114 disposed within the cavity 96 and abutting the first rack 78, the second rack 178, and the leg portion 66. That is, the annular piston 114 may be spaced apart from the flange portion 64 of the seat 60, may surround the first tube 44, and may contact each of the first rack 78, the second rack 178, and the leg portion 66 of the seat 60. The annular piston 114 may be translatable along the central longitudinal axis 38 and may define the pressure chamber 110 having a volume 116 between the housing 94 and the tube 44. The pressure chamber 110 may be disposed in fluid communication with the port 106 as set forth above.

Referring again to FIGS. 3A and 3B, the jack assembly 36 may also include a first seal 118 disposed within the pressure chamber 110, attached to the annular piston 114, and abutting the housing 94 and the tube 44. As such, the first seal 118 may travel with the annular piston 114 as the annular piston 114 translates along the central longitudinal axis 38. The jack assembly 36 may also include a second seal 120 disposed within the pressure chamber 110, spaced apart from the first seal 118 along the central longitudinal axis 38, and abutting the housing 94 and the tube 44. That is, the second seal 120 may be disposed at the distal end 42 of the damper 34.

Figure 4:
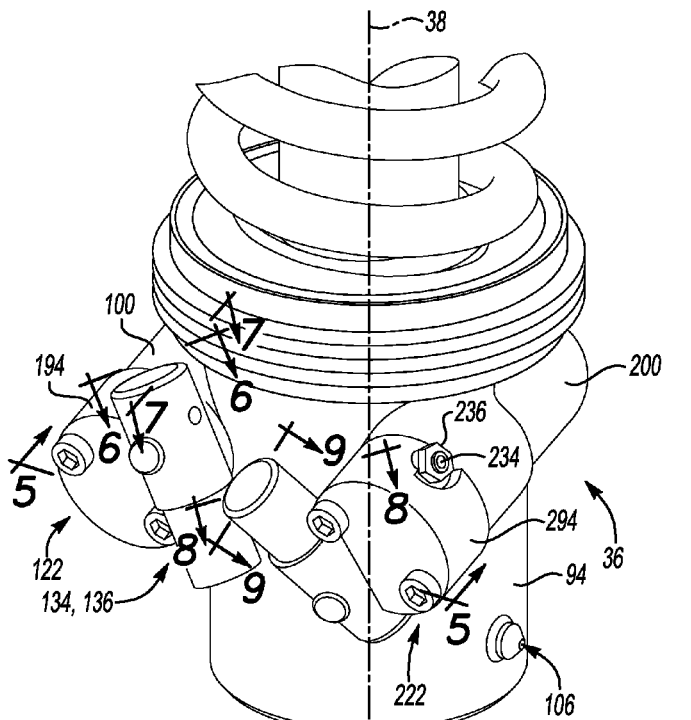
FIG. 4 is a schematic illustration of a perspective view of a jack assembly of the suspension system of FIG. 1.

Referring now to FIGS. 4 and 5, the jack assembly 36 may further include a first clutch 122 attached to the housing 94 and configured for restricting rotation of the first pinion 84 (FIG. 5) about the first axis 88 (FIG. 5). That is, the first clutch 122 may allow or prevent rotation of the first pinion 84 about the first axis 88 in either or both of the first direction 90 (FIG. 6A) and the second direction 92 (FIG. 6A) as the vehicle 14 (FIG. 1) translates across the surface 18 (FIG. 1) to thereby raise and lower the seat 60 along the central longitudinal axis 38.

Figures 6A, 6B:
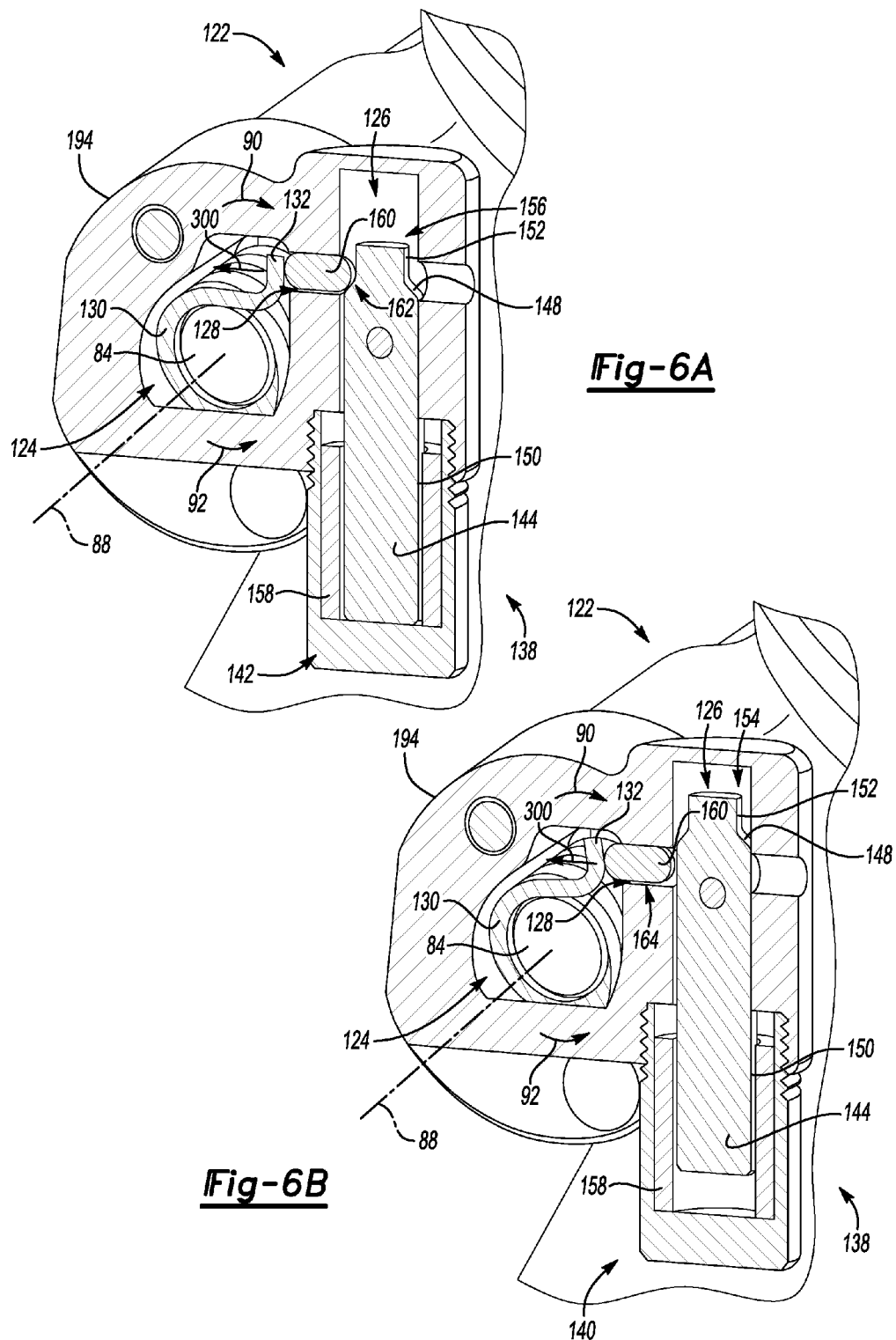
FIG. 6A is a schematic illustration of a cross-sectional perspective view of the suspension system of FIG. 4, taken along section lines 6-6, wherein a first actuator is disposed in a de-energized state.
FIG. 6B is a schematic illustration of a cross-sectional perspective view of the suspension system of FIG. 4, taken along section lines 6-6, wherein the first actuator of FIG. 6A is disposed in an energized state.

More specifically, referring now to FIGS. 6A and 6B, the first clutch 122 may include a first clutch housing 194 defining a first aperture 124, a first channel 126, and a first passage 128 therein. More specifically, the first passage 128 may interconnect the first aperture 124 and the first channel 126. In addition, the first clutch 122 may include a first spring clutch 130 disposed within the first aperture 124 and compressible about the first pinion 84. The first spring clutch 130 may be configured as a coil spring wrapped about the first pinion 84 and may have a first free end 132 and a first fixed end 134 (FIGS. 4 and 5). The first fixed end 134 may be spaced apart from the first free end 132 and may be attached to the first clutch housing 194. For example, as best shown in FIG. 4, a first set screw 136 may attach the first fixed end 134 to the first clutch housing 194. As such, the first spring clutch 130 may abut and tightly coil or wrap around the first pinion 84 within the first aperture 124. However, when the first free end 132 is translated in a direction (represented generally at 300) perpendicular to the first axis 88, the first spring clutch 130 may unwrap from the first pinion 84 such that the first pinion 84 may rotate freely about the first axis 88 in two directions, e.g., in the first direction 90 (FIG. 6A) and the second direction 92 (FIG. 6A).

With continued reference to FIGS. 6A and 6B, the first clutch 122 may further include a first actuator 138 attached to the first clutch housing 194 and transitionable between a first energized state 140 (FIG. 6B) and a first de-energized state 142 (FIG. 6A). For example, the first actuator 138 may be a solenoid. That is, the first actuator 138 may include a first plunger 144 defining a first notch 146 (FIGS. 7A and 7B) and a first shoulder 148 therein. That is, the first plunger 144 may include a first body portion 150 and a first neck portion 152, and the first shoulder 148 may interconnect the first body portion 150 and the first neck portion 152.

Further, as shown by comparing FIGS. 6A and 6B, the first plunger 144 may be translatable within the first channel 126 between a first energized position 154 (FIG. 6B) and a first de-energized position 156 (FIG. 6A). The first plunger 144 may be electromagnetically controlled by a controller (not shown) and may translate within the first channel 126 in response to an electric current (not shown) that is supplied to the first actuator 138. The electric current may alternatingly and momentarily energize, e.g., magnetize, a first portion 158 of the solenoid and thereby translate the first plunger 144 within the first channel 126 between the first energized position 154 and the first de-energized position 156.

Referring again to FIGS. 6A and 6B, the first actuator 138 may also include a first push rod 160 translatable within the first passage 128 between a first locked position 162 (FIG. 6A) in which the first spring clutch 130 is compressed about and contacts the first pinion 84 so that the first pinion 84 does not rotate about the first axis 88, and a first unlocked position 164 (FIG. 6B) in which the first spring clutch 130 is not compressed about the first pinion 84 so that the first pinion 84 rotates about the first axis 88. That is, the first push rod 160 may be abuttable with the first plunger 144 and the first free end 132. In particular, the first body portion 150 may abut the first push rod 160 when the first actuator 138 is in the first energized state 140 (FIG. 6B), and the first shoulder 148 and first neck portion 152 of the first plunger 144 may abut the first push rod 160 when the first actuator 138 is in the first de-energized state 142 (FIG. 6A).

Therefore, in operation, as described with comparison of FIGS. 6A and 6B, the first actuator 138 may transition from the first de-energized state 142 (FIG. 6A) to the first energized state 140 (FIG. 6B) and may abut the first push rod 160 so that the first push rod 160 translates within the first passage 128 to the first unlocked position 164 (FIG. 6B). In the first unlocked position 164, the first push rod 160 may abut the first free end 132 so that the first spring clutch 130 decompresses about and unwraps from the first pinion 84 such that the first pinion 84 is rotatable about the first axis 88 in two directions, e.g., in the first direction 90 and in the second direction 92. Stated differently, when the first push rod 160 is in the first unlocked position 164, the first pinion 84 may rotate freely about the first axis 88 in two directions, e.g., in both the first direction 90 and the second direction 92.

Conversely, in operation, the first actuator 138 may transition from the first energized state 140 (FIG. 6B) to the first de-energized state 142 (FIG. 6A) and the first push rod 160 may abut the first shoulder 148 and first neck portion 152 of the first plunger 144. As such, the first push rod 160 may translate within the first passage 128 from the first unlocked position 164 (FIG. 6B) to the first locked position 162 (FIG. 6A). In the first locked position 162, the first free end 132 may rest against the first push rod 160 so that the first spring clutch 130 may compress against and wrap about the first pinion 84 such that the first pinion 84 is rotatable about the first axis 88 in a single direction, e.g., in the second direction 92, and is not rotatable about the first axis 88 in, for example, the first direction 90.

Referring now to FIGS. 7A and 7B, the first clutch housing 194 may also define a first bore 166 therein. Further, the first actuator 138 may also include a first locking element 168 extending between the first notch 146 and the first bore 166 and transitionable between a first toggled position 176 (FIG. 7A) and a first untoggled position 190 (FIG. 7B). For example, the first locking element 168 may be characterized as an over-toggle mechanism. The first locking element 168 may be formed as a coiled spring extending between the first notch 146 and the first bore 166 and may be configured for retaining the first plunger 144 in the first de-energized position 156 (FIG. 7A) when the first actuator 138 is in the first de-energized state 142 (FIG. 7A), and in the first energized position 154 (FIG. 7B) when the first actuator 138 is in the first energized state 140 (FIG. 7B). Therefore, the first locking element 168 may minimize an amount of electric current (not shown) required for activation of the first actuator 138. More specifically, once electric current has been supplied to the first actuator 138 to transition the first actuator 138 to, for example, the first energized state 140, the first locking element 168 may retain the first push rod 160 (FIG. 6B) in the first unlocked position 164 (FIG. 6B) even if electrical current is no longer supplied to the first actuator 138. That is, a potential energy of the first locking element 168 may retain the position 176, 190 (FIG. 7A, 7B) achieved during activation without continuous supply of electric current to the first actuator 138.

Therefore, in operation, as described with comparison between FIGS. 6A, 6B, 7A, and 7B, the first actuator 138 may transition from the first de-energized state 142 (FIG. 7A) to the first energized state 140 (FIG. 7B) and may abut the first push rod 160 (FIGS. 6A and 6B) so that the first push rod 160 translates within the first passage 128 (FIGS. 6A and 6B) to the first unlocked position 164 (FIG. 6B). In the first unlocked position 164, the first push rod 160 may abut the first free end 132 (FIG. 6B) so that the first locking element 168 transitions from the first toggled position 176 (FIG. 7A) to the first untoggled position 190 (FIG. 7B) such the first pinion 84 (FIGS. 6A and 6B) is rotatable about the first axis 88 (FIGS. 6A and 6B) in the first direction 90 (FIG. 6A) and the second direction 92 (FIG. 6A). Stated differently, when the first locking element 168 is in the first untoggled position 190, the first pinion 84 may rotate freely about the first axis 88 in two directions, e.g., in both the first direction 90 and the second direction 92.

Conversely, in operation, the first actuator 138 may transition from the first energized state 140 (FIG. 7B) to the first de-energized state 142 (FIG. 7A) and the first push rod 160 (FIGS. 6A and 6B) may abut the first shoulder 148 and first neck portion 152 of the first plunger 144. As such, the first push rod 160 may translate within the first passage 128 from the first unlocked position 164 (FIG. 6B) to the first locked position 162 (FIG. 6A). In the first locked position 162, the first free end 132 may rest against the first push rod 160 so that the first locking element 168 (FIGS. 7A and 7B) may transition from the first untoggled position 190 (FIG. 7B) to the first toggled position 176 (FIG. 7A) such that the first pinion 84 (FIGS. 6A and 6B) is only rotatable about the first axis 88 (FIGS. 6A and 6B) in the single direction, e.g., in the second direction 92, and is not rotatable about the first axis 88 in, for example, the first direction 90.

Referring again to FIG. 4, the jack assembly 36 may also include a second clutch 222 attached to the housing 94 and configured for restricting rotation of the second pinion 184 (FIG. 5) about the second axis 188 (FIG. 5). That is, the second clutch 222 may allow or prevent rotation of the second pinion 184 about the second axis 188 in either or both of the first direction 90 (FIG. 8A) and the second direction 92 (FIG. 8A) as the vehicle 14 (FIG. 1) translates across the surface 18 (FIG. 1) to thereby raise and lower the seat 60 (FIG. 3) along the central longitudinal axis 38 (FIG. 3). Further, as shown in FIG. 4, the first clutch 122 and the second clutch 222 may be disposed opposite from one another and may be rotated about 180 degrees from one another across a plane intersecting the central longitudinal axis 38.

More specifically, referring now to FIGS. 8A and 8B, the second clutch 222 may include a second clutch housing 294 defining a second aperture 224, a second channel 226, and a second passage 228 therein. More specifically, the second passage 228 may interconnect the second aperture 224 and the second channel 226. In addition, the second clutch 222 may include a second spring clutch 230 disposed within the second aperture 224 and compressible about the second pinion 184. The second spring clutch 230 may be configured as a coil spring wrapped about the second pinion 184 and may have a second free end 232 and a second fixed end 234 (FIG. 4). The second fixed end 234 may be spaced apart from the second free end 232 and may be attached to the second clutch housing 294. For example, as best shown in FIG. 4, a second set screw 236 may attach the second fixed end 234 to the second clutch housing 294. As such, the second spring clutch 230 may abut and tightly coil or wrap around the second pinion 184 within the second aperture 224. However, when the second free end 232 is translated in the direction 300 perpendicular to the second axis 188, the second spring clutch 230 may decompress and unwrap from the second pinion 184 such that the second pinion 184 may rotate freely about the second axis 188.

With continued reference to FIGS. 8A and 8B, the second clutch 222 may further include a second actuator 238 attached to the second clutch housing 294 and transitionable between a second energized state 240 (FIG. 8B) and a second de-energized state 242 (FIG. 8A). For example, the second actuator 238 may be a solenoid. That is, the second actuator 238 may include a second plunger 244 defining a second notch 246 (FIGS. 9A and 9B) and a second shoulder 248 therein. That is, the second plunger 244 may include a second body portion 250 and a second neck portion 252, and the second shoulder 248 may interconnect the second body portion 250 and the second neck portion 252.

Further, the second plunger 244 may be translatable within the second channel 226 between a second energized position 254 (FIG. 8B) and a second de-energized position 256 (FIG. 8A). The second plunger 244 may be electromagnetically controlled by a controller (not shown) and may translate within the second channel 226 in response to an electric current (not shown) that is supplied to the second actuator 238. The electric current may alternatingly and momentarily energize, e.g., magnetize, a second portion 258 of the solenoid and thereby translate the second plunger 244 within the second channel 226 between the second energized position 254 and the second de-energized position 256.

Referring again to FIGS. 8A and 8B, the second actuator 238 may also include a second push rod 260 translatable within the second passage 228 between a second locked position 262 (FIG. 8A) in which the second spring clutch 230 is compressed about and contacts the second pinion 184 so that the second pinion 184 does not rotate about the second axis 188, and a second unlocked position 264 (FIG. 8B) in which the second spring clutch 230 is not compressed about the second pinion 184 so that the second pinion 184 rotates about the second axis 188. That is, the second push rod 260 may be abuttable with the second plunger 244 and the second free end 232. In particular, the second body portion 250 may abut the second push rod 260 when the second actuator 238 is in the second energized state 240 (FIG. 8B), and the second shoulder 248 and second neck portion 252 of the second plunger 244 may abut the second push rod 260 when the second actuator 238 is in the second de-energized state 242 (FIG. 8A).

Therefore, in operation, as described with comparison of FIGS. 8A and 8B, the second actuator 238 may transition from the second de-energized state 242 (FIG. 8A) to the second energized state 240 (FIG. 8B) and may abut the second push rod 260 so that the second push rod 260 translates within the second passage 228 to the second unlocked position 264 (FIG. 8B). In the second unlocked position 264, the second push rod 260 may abut the second free end 232 so that the second spring clutch 230 decompresses about and unwraps from the second pinion 184 such that the second pinion 184 is rotatable about the second axis 188 in two directions, e.g., in the first direction 90 and in the second direction 92. Stated differently, when the second push rod 260 is in the second unlocked position 264, the second pinion 184 may rotate freely about the second axis 188 in both the first direction 90 and the second direction 92.

Conversely, in operation, the second actuator 238 may transition from the second energized state 240 (FIG. 8B) to the second de-energized state 242 (FIG. 8A) and the second push rod 260 may abut the second shoulder 248 and second neck portion 252 of the second plunger 244. As such, the second push rod 260 may translate within the second passage 228 from the second unlocked position 264 (FIG. 8B) to the second locked position 262 (FIG. 8A). In the second locked position 262, the second free end 232 may rest against the second push rod 260 so that the second spring clutch 230 may compress against and wrap about the second pinion 184 such that the second pinion 184 is rotatable about the second axis 188 in the single direction, e.g., in only the second direction 92 or in a singular direction corresponding to the single direction of the first pinion 84, and is not rotatable about the second axis 188 in, for example, the first direction 90.

Figure 9A:
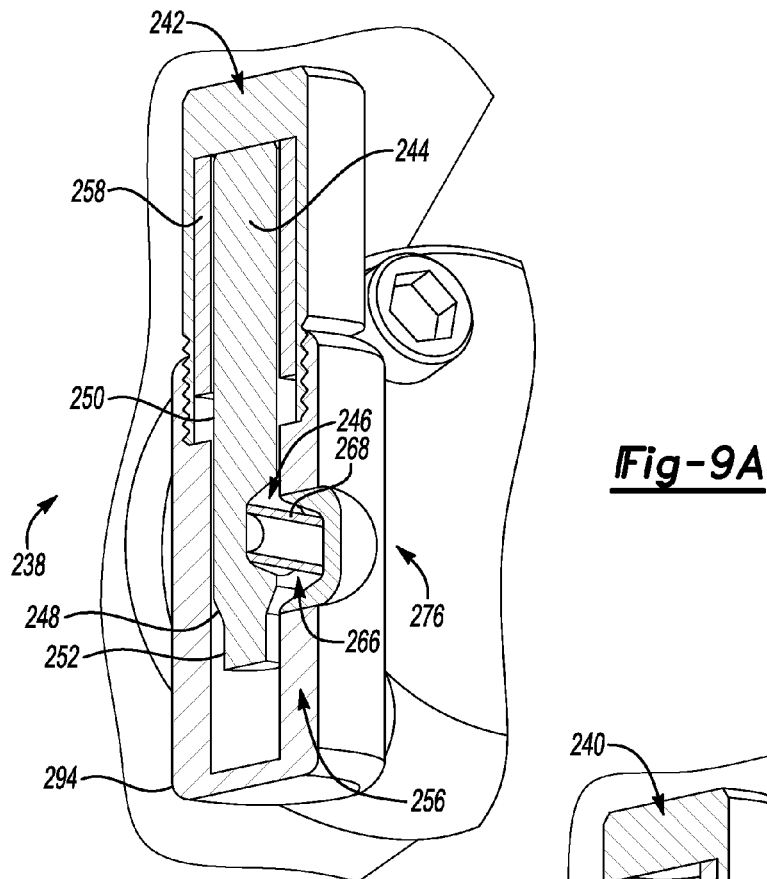
FIG. 9A is a schematic illustration of a cross-sectional perspective view of the suspension system of FIG. 4, taken along section lines 9-9, wherein the second actuator of FIG. 8A is disposed in the de-energized state.
Figure 9B:
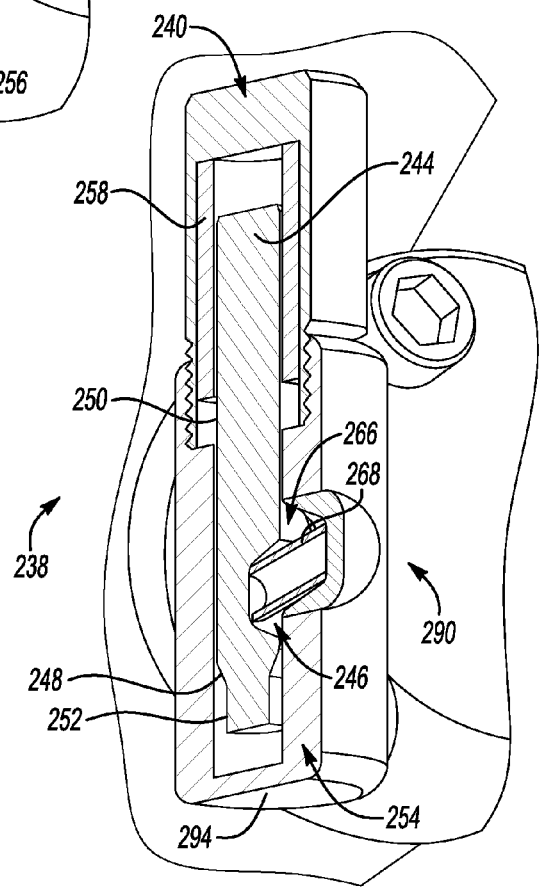
FIG. 9B is a schematic illustration of a cross-sectional perspective view of the suspension system of FIG. 4, taken along section lines 9-9, wherein the second actuator of FIG. 8A is disposed in the energized state.

Referring now to FIGS. 9A and 9B, the second clutch housing 294 may also define a second bore 266 therein. Further, the second actuator 238 may also include a second locking element 268 extending between the second notch 246 and the second bore 266 and transitionable between a second toggled position 276 (FIG. 9A) and a second untoggled position 290 (FIG. 9B). For example, the second locking element 268 may be characterized as an over-toggle mechanism. The second locking element 268 may be formed as a coiled spring extending between the second notch 246 and the second bore 266 and may be configured for retaining the second plunger 244 in the second de-energized position 256 (FIG. 9A) when the second actuator 238 is in the second de-energized state 242 (FIG. 9A), and in the second energized position 254 (FIG. 9B) when the second actuator 238 is in the second energized state 240 (FIG. 9B). Therefore, the second locking element 268 may minimize an amount of electric current (not shown)

required for activation of the second actuator 238. More specifically, once electric current has been supplied to the second actuator 238 to transition the second actuator 238 to, for example, the second energized state 240, the second locking element 268 may retain the second push rod 260 in the second unlocked position 264 (FIG. 8B) even if electrical current is no longer supplied to the second actuator 238. That is, a potential energy of the second locking element 268 may retain the position 276, 290 (FIGS. 9A, 9B) achieved during activation without continuous supply of electric current to the second actuator 238.

Therefore, in operation, as described with comparison between FIGS. 8A, 8B, 9A, and 9B, the second actuator 238 may transition from the second de-energized state 242 (FIG. 9A) to the second energized state 240 (FIG. 9B) and may abut the second push rod 260 (FIGS. 8A and 8B) so that the second push rod 260 translates within the second passage 228 (FIGS. 8A and 8B) to the second unlocked position 264 (FIG. 8B). In the second unlocked position 264, the second push rod 260 may abut the second free end 232 (FIGS. 8A and 8B) so that the second locking element 268 (FIGS. 9A and 9B) transitions from the second toggled position 276 (FIG. 9A) to the second untoggled position 290 (FIG. 9B) such the second pinion 184 (FIGS. 8A and 8B) is rotatable about the second axis 188 (FIGS. 8A and 8B) in two directions, e.g., the first direction 90 (FIG. 8A) and the second direction 92 (FIG. 8A). Stated differently, when the second locking element 268 is in the second untoggled position 290, the second pinion 184 may rotate freely about the second axis 188 in both the first direction 90 and the second direction 92.

Conversely, in operation, the second actuator 238 may transition from the second energized state 240 (FIG. 9B) to the second de-energized state 242 (FIG. 9A) and the second push rod 260 (FIGS. 8A and 8B) may abut the second shoulder 248 and second neck portion 252 of the second plunger 244. As such, the second push rod 260 may translate within the second passage 228 (FIGS. 8A and 8B) from the second unlocked position 264 (FIG. 8B) to the second locked position 262 (FIG. 8A). In the second locked position 262, the second free end 232 (FIGS. 8A and 8B) may rest against the second push rod 260 so that the second locking element 268 (FIGS. 9A and 9B) may transition from the second untoggled position 290 (FIG. 9B) to the second toggled position 276 (FIG. 9A) such that the second pinion 184 (FIGS. 8A and 8B) is rotatable about the second axis 188 (FIGS. 8A and 8B) in the single direction, e.g., in the second direction 92 or in the singular direction corresponding to the single direction of the first pinion 84, and is not rotatable about the second axis 188 in, for example, the first direction 90.

Referring again to FIGS. 3A and 3B, the jack assembly 36 may also include a lower mount 192 abutting the flange portion 64 of the seat 60. The lower mount 192 may be annular and may be seated or disposed in contact with the flange portion 64. More specifically, the flange portion 64 may include an upper surface 394 and the lower mount 192 may abut the upper surface 394. The upper surface 394 may be concave and may be generally L-shaped. Further, as best shown in cross-section in FIG. 3A, the upper surface 394 may slope from a left-hand side 196 of the damper 34 to the a right-hand side 198 of the damper 34. That is, the upper surface 394 may be configured as an annular ramp coaxial with the central longitudinal axis 38.

As also shown in FIGS. 3A and 3B, the suspension system 16 may further include a resilient member 206, e.g., a coiled spring, disposed between and attached to the upper strut mount 26 and the lower mount 192. The resilient member 206 may be coiled about the damper 34 and coupled to the upper strut mount 26 and the lower mount 192. The resilient member 206 may support the body 20 (FIG. 1) and may further assist in dampening oscillations of the body 20 as the vehicle 14 (FIG. 1) travels along an uneven portion 32 (FIG. 1) of the surface 18 (FIG. 1).

As shown in FIGS. 3A and 3B, the suspension system 16 may also include a bumper stop 208 concentric with the central longitudinal axis 38 and disposed between the piston rod 50 and the upper strut mount 26. That is, the piston rod 50 may extend through the bumper stop 208, and the bumper stop 208 may protect the upper strut mount 26 from contacting the damper 34 during operation of the vehicle 14 (FIG. 1).

Further, as best shown in FIG. 2B, the suspension system 16 may further include a shield 210 concentric with the central longitudinal axis 38 and disposed between the tube 44 and the resilient member 206. The shield 210 may be characterized as a dust boot cover and may be configured for protecting the proximal end 40 of the damper 34 from contaminants such as debris, dust, and/or fluid.

Similarly, referring again to FIGS. 2B, 3A, and 3B, the suspension system 16 may further include a boot 212 extending between and connected to the lower mount 192 (FIGS. 3A and 3B) and the housing 94 (FIGS. 3A and 3B). The boot 212 may also be characterized as a dust boot cover and may be configured for protecting the seat 60 (FIGS. 3A and 3B), the lower mount 192, and the tube 44 from contaminants such as debris, dust, and/or fluid. The boot 212 may be formed from a flexible material and may have an accordion or bellowed shape that includes a plurality of ridges. The boot 212 may be attached to the housing 94 and the lower mount 192 and may expand or stretch along the central longitudinal axis 38 as the seat 60 translates toward the proximal end 40 of the damper 34, and may compress or fold along the central longitudinal axis 38 as the seat 60 translates toward the distal end 42 of the damper 34.

Referring now to FIG. 11, in operation, the suspension system 16 may prevent translation of the seat 60 along the damper 34 to thereby maintain a ride height 302 of the vehicle 14 as compared to the reference height 304. That is, the suspension system 16 may maintain a vertical position of the seat 60 with respect to the tube 44 along the central longitudinal axis 38. In particular, when the first actuator 138 is in the first de-energized state 142, the first pinion 84 may not be rotatable about the first axis 88 in the first direction 90 and may be rotatable about the first axis 88 in the second direction 92. As such, the first spring clutch 130 (FIG. 6A) may be compressed about the first pinion 84, i.e., the first spring clutch 130 may be engaged against the first pinion 84, and the first actuator 138 may lock the seat 60 in place and prevent any downward displacement of the seat 60 toward the distal end 42 of the damper 34 along the central longitudinal axis 38. Similarly, when the second actuator 238 is in the second de-energized state 242, the second pinion 184 may be rotatable about the second axis 188 in the single direction. For example, the second pinion 184 may not be rotatable about the second axis 188 in the first direction 90 and may be rotatable about the second axis 188 in the second direction 92 when the second actuator 238 is in the second de-energized state 242. As such, the second spring clutch 230 (FIG. 8A) may be compressed against the second pinion 184, i.e., the second spring clutch 230 may be engaged against the second pinion 184, and the second actuator 238 may lock the seat 60 in place and prevent any upward displacement of the seat 60 towards the proximal end 40 of the damper 34 along the central longitudinal axis 38. Therefore, when both the first actuator 138 and the second actuator 238 are in the first de-energized state 142 and the second de-energized state 242, respectively, the seat 60 may not translate with respect to the damper 34 along the central longitudinal axis 38. That is, the first pinion 84 may be rotatable about the first axis 88 in the single direction, e.g., the second direction 92, and the first pinion 84 may not be rotatable about the first axis 88 in, for example, the first direction 90 when the first actuator 138 is in the first de-energized state 142. Likewise, the second pinion 184 may be rotatable about the second axis 188 in the single direction, e.g., the second direction 92, and the second pinion 84 may not be rotatable about the second axis 188 in, for example, the first direction 90 when the second actuator 238 is in the second de-energized state 242 so that the seat 60 does not translate with respect to the damper 34 along the central longitudinal axis 38.

Stated differently and as described with continued reference to FIG. 11, the first pinion 84 may be rotatable about the first axis 88 in the single direction, e.g., in only the second direction 92, and the second pinion 184 may be rotatable about the second axis 188 in the single direction, e.g., in only the second direction 92, so that the first seal 118 is stationary along the central longitudinal axis 38 with respect to the second seal 120 such that the volume 116 is maintained as the working piston 52 translates along the central longitudinal axis 38. That is, the first pinion 84 may not be rotatable about the first axis 88 in the first direction 90, and the second pinion 184 may not be rotatable about the second axis 188 in the first direction 90 so that the first seal 118 does not translate along the central longitudinal axis 38 with respect to the second seal 120 such that the volume 116 does not change as the working piston 52 translates along the central longitudinal axis 38. Therefore, although the wheel 22 may travel along an uneven portion 32 of the surface 18, e.g., along a bump on and/or a recession in the surface 18, the volume 116 of the pressure chamber 110 may not change so that the damper 34 functions without translation of the seat 60 along the central longitudinal axis 38.

In particular, referring to a neutral surface 214, a raised surface 216, e.g., a bump, and a recessed surface 218, e.g., a pothole, of FIG. 11, as the wheel 22 travels along the surface 18 from the neutral surface 214 to the raised surface 216, the damper 34 may translate towards the upper strut mount 26 along the central longitudinal axis 38 and the resilient member 206 may compress along the central longitudinal axis 38. However, since the first pinion 84 is not rotatable about the first axis 88 in the first direction 90 and the second pinion 184 is not rotatable about the second axis 188 in the first direction 90, the seat 60 may not translate along the central longitudinal axis 38 and the volume 116 of the pressure chamber 110 may not change. That is, the first seal 118 may not travel towards or away from the second seal 120 since the seat 60 remains stationary or fixed in vertical position against the tube 44.

Similarly, as the wheel 22 travels along the surface 18 from the raised surface 216 to the recessed surface 218, the damper 34 may translate away from the upper strut mount 26 along the central longitudinal axis 38 and the resilient member 206 may decompress and elongate along the central longitudinal axis 38. However, since the first pinion 84 is not rotatable about the first axis 88 in the first direction 90 and the second pinion 184 is not rotatable about the second axis 188 in the first direction 90, the seat 60 may not translate along the central longitudinal axis 38 and the volume 116 of the pressure chamber 110 may not change. That is, the first seal 118 may not travel towards or away from the second seal 120 since the seat 60 remains stationary or fixed in vertical position against the tube 44. Therefore, a corner weight of the vehicle 14 (FIG. 1) is maintained at a predetermined position by both a spring force of the resilient member 206 and a force exerted by the pressurized gas 58 (FIG. 3A) within the pressure chamber 110, and a ride height 302 of the vehicle 14 may be maintained as the wheel 22 travels along the uneven portions 32 of the surface 18.

Referring now to FIG. 12, in operation, the suspension system 16 may allow upwards translation of the seat 60 toward the proximal end 40 of the damper 34 along the central longitudinal axis 38 to thereby raise the ride height 302 of the vehicle 14 with respect to the reference height 304. That is, the suspension system 16 may raise a vertical position of the seat 60 with respect to the tube 44 along the central longitudinal axis 38. In particular, when the first actuator 138 is in the first de-energized state 142, the first pinion 84 may be rotatable about the first axis 88 in the single direction. For example, the first pinion 84 may not be rotatable about the first axis 88 in the first direction 90 and may be rotatable about the first axis 88 in the second direction 92 when the first actuator 138 is in the first de-energized state 142. As such, the first spring clutch 130 (FIG. 6A) may be compressed about the first pinion 84, i.e., the first spring clutch 130 may be engaged against the first pinion, and the first actuator 138 may prevent any downward displacement of the seat 60 toward the distal end 42 of the damper 34 along the central longitudinal axis 38. In addition, when the second actuator 238 is in the second energized state 240, the second pinion 184 may be rotatable about the second axis 188 in two directions, e.g., in the first direction 90 and the second direction 92. As such, the second spring clutch 230 (FIG. 8A) may not be compressed against the second pinion 184, i.e., the second spring clutch 230 may be disengaged from the second pinion 184, and the second actuator 238 may allow upward displacement of the seat 60 towards the proximal end 40 of the damper 34 along the central longitudinal axis 38. Therefore, when the first actuator 138 is in the first de-energized state 142 and the second actuator 238 is in the second energized state 240, the seat 60 may translate upwards with respect to the damper 34 along the central longitudinal axis 38.

Stated differently and as described with continued reference to FIG. 12, the seat 60 may translate towards the proximal end 40 from the distal end 42 along the central longitudinal axis 38. That is, the seat 60 may translate towards the proximal end 40 along the central longitudinal axis 38 and may not translate towards the distal end 42 along the central longitudinal axis 38. More specifically, the first pinion 84 may be rotatable about the first axis 88 in the single direction, e.g., in only the second direction 92, and the second pinion 184 may be rotatable about the second axis 188 in two directions, e.g., in the first direction 90 and in the second direction 92, so that the first seal 118 translates along the central longitudinal axis 38 with respect to the second seal 120 such that the volume 116 increases as the working piston 52 translates along the central longitudinal axis 38. That is, the first pinion 84 may not be rotatable about the first axis 88 in the first direction 90, and the second pinion 184 may be rotatable about the second axis 188 in the first direction 90 and the second direction 92 so that the first seal 118 translates along the central longitudinal axis 38 with respect to the second seal 120 such that the volume 116 increases as the working piston 52 translates along the central longitudinal axis 38. Therefore, as the wheel 22 travels along an uneven portion 32 of the surface 18, the volume 116 of the pressure chamber 110 may increase so that the damper 34 functions in series with the seat 60.

In particular, referring to the neutral surface 214 and the recessed surface 218 of FIG. 12, as the wheel 22 travels along the surface 18 from the neutral surface 214 to the recessed surface 218, the wheel 22 and the damper 34 may translate away from the upper strut mount 26 along the central longitudinal axis 38. However, since the first pinion 84 is not rotatable about the first axis 88 in the first direction 90 and the second pinion 184 is rotatable about the second axis 188 in the first direction 90 and the second direction 92, the seat 60 may translate upwards along the central longitudinal axis 38 and the volume 116 of the pressure chamber 110 may increase. That is, the first seal 118 may travel away from the second seal 120 and the seat 60 may not remain stationary or fixed in vertical position against the tube 44. In particular, the seat 60 may translate upwards along the central longitudinal axis 38 with respect to the tube 44 an incremental distance 220 corresponding to a difference between the corner weight of the vehicle 14 (FIG. 1) and the force exerted by the pressurized gas 58 (FIG. 3A) within the pressure chamber 110. As the suspension system 16 cycles along the central longitudinal axis 38 during jounce and rebound conditions, the resilient member 206 and the pressure chamber 110 of the jack assembly 36 may function in series.

Similarly, as the wheel 22 travels along the surface 18 from the recessed surface 218 to the neutral surface 214, the damper 34 may again translate toward the upper strut mount 26 along the central longitudinal axis 38. However, since the seat 60 is prevented from translating downward toward the distal end 42 of the damper 34, the suspension system 16 may inherit the additional incremental distance 220 and raise the ride height 302 of the vehicle 14. Therefore, as the suspension system 16 cycles, the accumulated increase in the volume 116 of the pressure chamber 110 may be preserved, and the suspension system 16 may raise the body 20 (FIG. 1) of the vehicle 14 (FIG. 1). During jounce events, the resilient member 206 may provide energy dissipation. During rebound events, the suspension system 16 may operate as a spring in series system, i.e., the resilient member 206 may cooperate with the pressure chamber 110 to dissipate energy. Therefore, during operation, the suspension system 16 may raise the body 20 of the vehicle 14 past an original predetermined position or reference height 304 as the suspension system 16 cycles during jounce and rebound events.

At any time during operation of the suspension system 16 according to the conditions of FIG. 12, the suspension system 16 may maintain the ride height 302 of the vehicle 14 (FIG. 1). That is, after the suspension system 16 raises the body 20 (FIG. 1) of the vehicle 14, the suspension system 16 may maintain the raised ride height 302 of the vehicle 14. For example, once the high position target 74 (FIG. 10) communicates with the travel position sensor 76 (FIG. 10), the vertical position of the seat 60 may not change, i.e., the seat 60 may no longer translate with respect to the damper 34 along the central longitudinal axis 38, and the resilient member 206 of the suspension system 16 may provide energy dissipation.

Referring now to FIG. 13, in operation, the suspension system 16 may allow downward translation of the seat 60 toward the distal end 42 of the damper 34 along the central longitudinal axis 38 to thereby lower the ride height 302 of the vehicle 14 (FIG. 1). That is, the suspension system 16 may lower a vertical position of the seat 60 with respect to the tube 44 along the central longitudinal axis 38. In particular, when the first actuator 138 is in the first energized state 140, the first pinion 84 may be rotatable about the first axis 88 in two directions, e.g., in the first direction 90 and the second direction 92. As such, the first spring clutch 130 may not be compressed against the first pinion 84, i.e., the first spring clutch 130 (FIG. 6A) may be disengaged from the first pinion 84, and the first actuator 138 may prevent any downward displacement of the seat 60 toward the distal end 42 of the damper 34 along the central longitudinal axis 38. In addition, when the second actuator 238 is in the second de-energized state 242, the second pinion 184 may be rotatable about the second axis 188 in the single direction. For example, the second pinion 184 may not be rotatable about the second axis 188 in the first direction 90 and may be rotatable about the second axis 188 in the second direction 92 when the second actuator 238 is in the second de-energized state 242. As such, the second spring clutch 230 may be compressed against the second pinion 184, i.e., the second spring clutch 230 (FIG. 8A) may be engaged with the second pinion 184, and the second actuator 238 may allow downward displacement of the seat 60 towards the distal end 42 of the damper 34 along the central longitudinal axis 38. Therefore, when the first actuator 138 is in the first energized state 140 and the second actuator 238 is in the second de-energized state 242, the seat 60 may translate downward with respect to the damper 34 along the central longitudinal axis 38.

Stated differently and as described with continued reference to FIG. 13, the seat 60 may translate towards the distal end 42 from the proximal end 40 along the central longitudinal axis 38. That is, the seat 60 may translate towards the distal end 42 along the central longitudinal axis 38 and may not translate towards the proximal end 40 along the central longitudinal axis 38. More specifically, the first pinion 84 may be rotatable about the first axis 88 in two directions, e.g., in the first direction 90 and in the second direction 92, and the second pinion 184 may be rotatable about the second axis 188 in the single direction, e.g., in only the second direction 92, so that the first seal 118 translates along the central longitudinal axis 38 with respect to the second seal 120 such that the volume 116 decreases as the working piston 52 translates along the central longitudinal axis 38. That is, the first pinion 84 may be rotatable about the first axis 88 in the first direction 90 and the second direction 92, and the second pinion 184 may not be rotatable about the second axis 188 in the first direction 90 so that the first seal 118 translates along the central longitudinal axis 38 with respect to the second seal 120 such that the volume 116 decreases as the working piston 52 translates along the central longitudinal axis 38. Therefore, as the wheel 22 travels along an uneven portion 32 of the surface 18, the volume 116 of the pressure chamber 110 may decrease so that the damper 34 may function in series with or along with the seat 60.

In particular, referring to the neutral surface 214 and the raised surface 216 of FIG. 13, as the wheel 22 travels from the neutral surface 214 to the raised surface 216, the wheel 22 and the damper 34 may translate toward the upper strut mount 26 along the central longitudinal axis 38. However, since the first pinion 84 is rotatable about the first axis 88 in the first direction 90 and the second direction 92 and the second pinion 184 is not rotatable in the first direction 90, the seat 60 may translate downwards along the central longitudinal axis 38 and the volume 116 of the pressure chamber 110 may decrease. That is, the first seal 118 may travel toward the second seal 120 and the seat 60 may not remain stationary or fixed in vertical position against the tube 44. In particular, the seat 60 may translate downward along the central longitudinal axis 38 with respect to the tube 44 a reduced incremental distance 222 corresponding to a difference between the corner weight of the vehicle 14 (FIG. 1) and the force exerted by the pressurized gas 58 (FIG. 3A) within the pressure chamber 110. As the suspension system 16 cycles along the central longitudinal axis 38 during jounce and rebound conditions, the resilient member 206 and the pressure chamber 110 of the jack assembly 36 may function together in series to dampen vibrations and oscillations of the body 20 (FIG. 1).

Similarly, as the wheel 22 travels from the recessed surface 218 to the neutral surface 214, the damper 34 may translate towards the wheel 22. However, since the seat 60 is prevented from translating upward toward the proximal end 40 of the damper 34, the suspension system 16 may inherit the reduced incremental distance 222 and lower the ride height 302 of the vehicle 14 (FIG. 1). That is, during operation, the suspension system 16 may lower the body 20 (FIG. 1) of the vehicle 14 below the original predetermined position as the suspension system 16 cycles during jounce and rebound events.

At any time during operation of the suspension system 16 according to the conditions of FIG. 13, the suspension system 16 may maintain the ride height 302 of the vehicle 14 (FIG. 1). That is, after the suspension system 16 lowers the body 20 (FIG. 1) of the vehicle 14, the suspension system 16 may maintain the ride height 302 of the vehicle 14. For example, once the low position target 174 (FIG. 10) communicates with the travel position sensor 76 (FIG. 10), the first clutch 122 and the second clutch 222 are de-energized, i.e., the first actuator 138 may be disposed in the first de-energized state 142 (FIG. 6A) and the second actuator 238 may be disposed in the second de-energized state 242 (FIG. 8A). Therefore, under such conditions, the vertical position of the seat 60 may not change, i.e., the seat 60 may not translate with respect to the damper 34 along the central longitudinal axis 38, and the resilient member 206 and the damper 36 of the suspension system 16 may provide energy dissipation.

It is to be appreciated that when the suspension system 16 does not cycle during jounce and rebound events, but is instead static, the spring force of the resilient member 206 and the force exerted by the pressurized gas 58 in the pressure chamber 110 may act in series to support the weight of the vehicle 14 and dispose the body 20 of the vehicle 14 at the original predetermined position.

Therefore, referring again to FIGS. 3A and 3B, a method of changing the ride height 302 (FIGS. 11-13) of the vehicle 14 includes actuating at least one of the first clutch 122 (FIGS. 4 and 5) and the second clutch 222 (FIGS. 4 and 5) to translate the seat 60 with respect to the damper 34 and thereby change the ride height 302 of the vehicle 14. More specifically, actuating may include translating the first rack 78 of the seat 60 along the first pinion 84. Similarly, actuating may include translating the second rack 178 of the seat 60 along the second pinion 184.

The method may further include rotating the first pinion 84 about the first axis 88 while rotating the second pinion 184 about the second axis 188. Alternatively, the method may include rotating the first pinion 84 about the first axis 88 while not rotating the second pinion 184 about the second axis 188. Likewise, the method may include rotating the second pinion 184 about the second axis 188 while not rotating the first pinion 84 about the first axis 88.

Although the suspension system 16 is described herein so that the first direction 90 is clockwise rotation, and the second direction 92 is counterclockwise rotation, the suspension system 16 may operate in reverse, i.e., wherein the first direction 90 refers to counterclockwise rotation and the second direction 92 refers to clockwise rotation. Further, although not shown, the suspension system 16 may operate in an upside-down configuration wherein the jack assembly 36 is disposed above the resilient member 206 along the central longitudinal axis 38.

Therefore, in summary and described with reference to FIGS. 3A and 3B, the working piston 52 may alternately cycle towards and away from the wheel 22 (FIG. 1) along the central longitudinal axis 38 as the wheel 22 translates the body 20 (FIG. 1) across the surface 18 (FIG. 1) to thereby raise or lower the seat 60 and the body 20 with respect to the wheel 22. As such, the suspension system 16 may be self-powered and may harness kinetic and potential energy otherwise dissipated by the damper 34 and the hydraulic fluid 54 to actuate the jack assembly 36. That is, jounce and rebound travel of the working piston 52 as the wheel 22 translates across an uneven portion 32 (FIG. 1) of the surface 18 may provide energy for raising the seat 60 and the body 20 with respect to the wheel 22, and stored potential energy of the body 20 of the vehicle 14 may provide energy for lowering the seat 60 and the body 20 with respect to the wheel 22.

Consequently, the suspension system 16 is economical and may provide self-powered control of the ride height 302 (FIGS. 11-13) of the body 20 (FIG. 1) with respect to the surface 18 (FIG. 1). That is, the suspension system 16 may provide sufficient suspension travel and/or ground clearance for the vehicle 14 (FIG. 1). Therefore, the suspension system 16 may improve aerodynamic drag and fuel economy for the vehicle 14, while also providing for convenient ingress into and egress from the passenger compartment 24 (FIG. 1). More specifically, the suspension system 16 may provide reduced aerodynamic drag for high-speed driving conditions, and sufficient ground clearance for low-speed driving conditions through a natural cycling of the piston rod 50 (FIG. 3A) within the damper 34. In addition, advantageously, the damper 34 may operate independently from the jack assembly 36. That is, the piston rod 50 may continue to translate along the central longitudinal axis 38 within the first chamber 46 whether the body 20 and suspension system 16 are disposed in a raising-, raised-, lowering-, lowered-, or any-position therebetween.

While the best modes for carrying out the disclosure have been described in detail, those familiar with the art to which this disclosure relates will recognize various alternative designs and embodiments for practicing the disclosure within the scope of the appended claims.

The invention claimed is:

1. A suspension system for a vehicle, the suspension system comprising:
   a damper having a central longitudinal axis; and
   a jack assembly attached to the damper including:
      a seat translatable with respect to the damper along the central longitudinal axis, wherein the seat includes:
         a first rack having a first exterior surface defining a plurality of first grooves therein; and
         a second rack having a second exterior surface defining a plurality of second grooves therein;
      a first pinion including a plurality of first teeth each matable with each of the plurality of first grooves; and
      a second pinion including a plurality of second teeth each matable with each of the plurality of second grooves.

2. The suspension system of claim 1, wherein the first pinion is rotatable about a first axis;
   wherein the second pinion is rotatable about a second axis; and
   wherein the first pinion and the second pinion are each independently rotatable so that the first pinion is traversable along the first rack and the second pinion is traversable along the second rack, thereby translating the seat along the central longitudinal axis.

3. The suspension system of claim 2, further including:
   a first clutch configured for restricting rotation of the first pinion about the first axis and including a first actuator transitionable between a first energized state and a first de-energized state; and a second clutch configured for restricting rotation of the second pinion about the second axis and including a second actuator transitionable between a second energized state and a second de-energized state.

4. The suspension system of claim 3, wherein the first pinion is rotatable about the first axis in a single direction when the first actuator is in the first de-energized state.

5. The suspension system of claim 4, wherein the second pinion is rotatable about the second axis in the single direction when the second actuator is in the second de-energized state so that the seat does not translate with respect to the damper along the central longitudinal axis.

6. The suspension system of claim 4, wherein the second pinion is rotatable about the second axis in two directions when the second actuator is in the second energized state.

7. The suspension system of claim 6, wherein the damper has a proximal end and a distal end spaced apart from the proximal end, and the seat translates towards the proximal end from the distal end along the central longitudinal axis.

8. The suspension system of claim 3, wherein the first pinion is rotatable about the first axis in two directions when the first actuator is in the first energized state.

9. The suspension system of claim 8, wherein the second pinion is rotatable about the second axis in a single direction when the second actuator is in the second de-energized state.

10. The suspension system of claim 9, wherein the damper has a proximal end and a distal end spaced apart from the proximal end, and the seat translates towards the distal end from the proximal end along the central longitudinal axis.

11. The suspension system of claim 3, wherein the first clutch further includes:
   a first clutch housing defining a first aperture, a first channel, a first bore, and a first passage therein, wherein the first passage interconnects the first aperture and the first channel;
   a first spring clutch disposed within the first aperture and compressible about the first pinion, wherein the first spring clutch has a first free end and a first fixed end spaced apart from the first free end and attached to the first clutch housing; and
   a first actuator attached to the first clutch housing and transitionable between a first energized state and a first de-energized state, wherein the first actuator includes:
      a first plunger defining a first notch therein and translatable within the first channel between a first energized position and a first de-energized position;
      a first push rod translatable within the first passage between a first locked position in which the first spring clutch is compressed about and contacts the first pinion so that the first pinion does not rotate about the first axis, and a first unlocked position in which the first spring clutch is not compressed about the first pinion so that the first pinion rotates about the first axis;
      wherein the first push rod is abuttable with the first plunger and the first free end; and
      a first locking element extending between the first notch and the first bore and transitionable between a first toggled position and a first untoggled position.

12. The suspension system of claim 11, wherein the first actuator transitions from the first de-energized state to the first energized state and abuts the first push rod so that the first push rod translates within the first passage to the first unlocked position and abuts the first free end so that the first spring clutch decompresses about and unwraps from the first pinion and so that the first locking element transitions from the first toggled position to the first untoggled position such that the first pinion is rotatable about the first axis in the first direction and in the second direction.

13. A suspension system for a vehicle, the suspension system comprising:
   an upper strut mount configured for attaching to the vehicle;
   a damper attached to the upper strut mount and having a central longitudinal axis, wherein the damper includes:
      a tube defining therein a first chamber and a second chamber spaced apart from the first chamber;
      a piston rod translatable along the central longitudinal axis within the first chamber; and
      a working piston connected to the piston rod and abutting the tube;
   a jack assembly attached to the damper including:
      a housing affixed to the tube and defining a cavity therein, wherein the housing is stationary with respect to the damper along the central longitudinal axis;
      a seat at least partially disposed within the cavity and abutting the tube, wherein the seat is translatable with respect to the damper along the central longitudinal axis and includes:
         a flange portion;
         a leg portion extending from the flange portion along the central longitudinal axis;
         a first rack disposed in contact with the flange portion and the leg portion and having a first exterior surface defining a plurality of first grooves therein; and
         a second rack spaced apart from the first rack about the central longitudinal axis, wherein the second rack is disposed in contact with the flange portion and the leg portion and has a second exterior surface defining a plurality of second grooves therein;
      a lower mount abutting the flange portion;
      a first pinion disposed within the cavity and including a plurality of first teeth each matable with each of the plurality of first grooves, wherein the first pinion is rotatable about a first axis and is not translatable along the central longitudinal axis;
      a second pinion disposed within the cavity and including a plurality of second teeth each matable with each of the plurality of second grooves, wherein the second pinion is rotatable about a second axis and is not translatable along the central longitudinal axis;
      an annular piston disposed within the cavity and abutting the first rack, the second rack, and the leg portion, wherein the annular piston is translatable along the central longitudinal axis and defines a pressure chamber having a volume between the housing and the tube;
      a first seal disposed within the pressure chamber, attached to the annular piston, and abutting the housing and the tube;
      a second seal disposed within the pressure chamber, spaced apart from the first seal along the central longitudinal axis, and abutting the housing and the tube;
      a first clutch attached to the housing and configured for restricting rotation of the first pinion about the first axis; and
      a second clutch attached to the housing and configured for restricting rotation of the second pinion about the second axis; and
   a resilient member disposed between and attached to the upper strut mount and the lower mount.

14. The suspension system of claim 13, wherein the first pinion is rotatable about the first axis in a single direction and the second pinion is rotatable about the second axis in the single direction so that the first seal is stationary along the central longitudinal axis with respect to the second seal such that the volume is maintained as the working piston translates along the central longitudinal axis.

15. The suspension system of claim 13, wherein the first pinion is rotatable about the first axis in a single direction and the second pinion is rotatable about the second axis in two directions so that the first seal translates along the central longitudinal axis with respect to the second seal such that the volume increases as the working piston translates along the central longitudinal axis.

16. The suspension system of claim 13, wherein the first pinion is rotatable about the first axis in two directions and the second pinion is rotatable about the second axis in a single direction so that the first seal translates along the central longitudinal axis with respect to the second seal such that the volume decreases as the working piston translates along the central longitudinal axis.

17. A vehicle comprising:
   a body;
   a wheel configured for translating the body across a surface; and
   a suspension system interconnecting the body and the wheel and including:
      a damper having a central longitudinal axis; and
      a jack assembly attached to the damper including:
         a seat translatable with respect to the damper along the central longitudinal axis, wherein the seat includes:
            a first rack having a first exterior surface defining a plurality of first grooves therein; and
            a second rack having a second exterior surface defining a plurality of second grooves therein;
         a first pinion including a plurality of first teeth each matable with each of the plurality of first grooves; and
         a second pinion including a plurality of second teeth each matable with each of the plurality of second grooves.

18. The vehicle of claim 17, wherein the suspension system further includes:
   an upper strut mount attached to the body and the damper;
   a steering component attached to the wheel; and
   a lower strut mount attached to the damper and the steering component.

* * * * *